(12) United States Patent
Taniguchi et al.

(10) Patent No.: US 10,836,933 B2
(45) Date of Patent: Nov. 17, 2020

(54) ADHESIVE LAYER AND ADHESIVE SHEET

(71) Applicant: DAI NIPPON PRINTING CO., LTD., Tokyo-to (JP)

(72) Inventors: Takahisa Taniguchi, Tokyo-to (JP); Kentaro Hoshi, Tokyo-to (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 146 days.

(21) Appl. No.: 15/976,323

(22) Filed: May 10, 2018

(65) Prior Publication Data

US 2018/0258325 A1 Sep. 13, 2018

Related U.S. Application Data

(63) Continuation of application No. 14/412,966, filed as application No. PCT/JP2013/068402 on Jul. 4, 2013, now abandoned.

(30) Foreign Application Priority Data

| Jul. 4, 2012 | (JP) | ................................. 2012-150913 |
| Sep. 7, 2012 | (JP) | ................................. 2012-197367 |
| Jun. 6, 2013 | (JP) | ................................. 2013-120254 |

(51) Int. Cl.
  *C08L 63/00* (2006.01)
  *C08L 33/06* (2006.01)
  (Continued)

(52) U.S. Cl.
  CPC .................. *C09J 7/10* (2018.01); *B32B 7/00* (2013.01); *B32B 7/06* (2013.01); *B32B 7/12* (2013.01);
  (Continued)

(58) Field of Classification Search
  None
  See application file for complete search history.

(56) References Cited

U.S. PATENT DOCUMENTS

2002/0170651 A1  11/2002  Edwards et al.
2007/0295607 A1  12/2007  Kawai
(Continued)

FOREIGN PATENT DOCUMENTS

EP  0 971 011 A2  1/2000
JP  H10-338851 A  12/1998
(Continued)

OTHER PUBLICATIONS

Sep. 17, 2013 International Search Report issued in International Patent Application No. PCT/JP2013/068402.
(Continued)

*Primary Examiner* — Alexandre F Ferre
(74) *Attorney, Agent, or Firm* — Oliff PLC

(57) ABSTRACT

A repairing or reinforcement method includes applying, to concrete, a pressure-sensitive or bonding adhesive sheet containing a first pressure-sensitive or bonding adhesive layer; and curing the first adhesive layer such that a first surface of the first adhesive layer is bonded to the concrete. The first adhesive layer contains an acrylic resin having a glass transition temperature of 15° C. or below, a liquid epoxy resin, a solid epoxy resin, and a curing agent.

21 Claims, 3 Drawing Sheets

(51) Int. Cl.
| | |
|---|---|
| *C09J 163/00* | (2006.01) |
| *C09J 7/10* | (2018.01) |
| *C09J 133/08* | (2006.01) |
| *E04G 23/04* | (2006.01) |
| *C08G 59/40* | (2006.01) |
| *C08G 59/50* | (2006.01) |
| *B32B 7/06* | (2019.01) |
| *B32B 27/08* | (2006.01) |
| *B32B 27/30* | (2006.01) |
| *B32B 27/38* | (2006.01) |
| *B32B 7/00* | (2019.01) |
| *B32B 7/12* | (2006.01) |
| *B32B 13/00* | (2006.01) |
| *B32B 13/04* | (2006.01) |
| *B32B 27/00* | (2006.01) |
| *B32B 27/06* | (2006.01) |
| *B32B 27/26* | (2006.01) |
| *E04G 23/02* | (2006.01) |
| *C09J 7/20* | (2018.01) |
| *C09J 7/38* | (2018.01) |

(52) U.S. Cl.
CPC .............. *B32B 13/00* (2013.01); *B32B 13/04* (2013.01); *B32B 27/00* (2013.01); *B32B 27/06* (2013.01); *B32B 27/08* (2013.01); *B32B 27/26* (2013.01); *B32B 27/30* (2013.01); *B32B 27/308* (2013.01); *B32B 27/38* (2013.01); *C08G 59/4021* (2013.01); *C08G 59/50* (2013.01); *C08L 33/06* (2013.01); *C08L 63/00* (2013.01); *C09J 7/20* (2018.01); *C09J 7/38* (2018.01); *C09J 7/387* (2018.01); *C09J 133/08* (2013.01); *C09J 163/00* (2013.01); *E04G 23/02* (2013.01); *E04G 23/04* (2013.01); *B32B 2307/712* (2013.01); *B32B 2307/756* (2013.01); *B32B 2307/762* (2013.01); *B32B 2405/00* (2013.01); *B32B 2419/00* (2013.01); *C09J 2301/302* (2020.08); *C09J 2433/00* (2013.01); *C09J 2463/00* (2013.01); *Y10T 428/1462* (2015.01)

(56) References Cited

U.S. PATENT DOCUMENTS

| | | | |
|---|---|---|---|
| 2009/0246915 | A1 | 10/2009 | Ichikawa et al. |
| 2010/0143673 | A1* | 6/2010 | Mitsukura ............ C08G 59/686 428/201 |
| 2010/0273940 | A1 | 10/2010 | Urakawa et al. |
| 2011/0003947 | A1* | 1/2011 | Kishi ...................... C08L 63/00 525/92 H |
| 2011/0067799 | A1* | 3/2011 | Mussig ...................... C09J 7/21 156/94 |
| 2011/0120614 | A1 | 5/2011 | Sugo et al. |
| 2012/0288659 | A1 | 11/2012 | Hoshi et al. |

FOREIGN PATENT DOCUMENTS

| | | |
|---|---|---|
| JP | 2001-219520 A | 8/2001 |
| JP | 2004-027718 A | 1/2004 |
| JP | 2005-187677 A | 7/2005 |
| JP | 2007-84632 A | 4/2007 |
| JP | 2007-224203 A | 9/2007 |
| JP | 2009-27074 A | 2/2009 |
| JP | 2009-138048 A | 6/2009 |
| JP | 2009-160878 A | 7/2009 |
| JP | 2010-95642 A | 4/2010 |
| JP | 2010-144360 A | 7/2010 |
| JP | 2011-168715 A | 9/2011 |
| WO | 03/017363 A1 | 2/2003 |
| WO | 2008/045270 A1 | 4/2008 |
| WO | 2011/083835 A1 | 7/2011 |
| WO | 2012/002437 A1 | 1/2012 |

OTHER PUBLICATIONS

Mar. 3, 2016 extended European Search Report issued in European Application No. 138132295.
Jun. 14, 2017 Office Action issued in U.S. Appl. No. 14/412,966.
Dec. 20, 2017 Office Action issued in U.S. Appl. No. 14/412,966.
Nov. 28, 2017 Office Action issued in Japanese Patent Application No. 2014-225831.

* cited by examiner

ADHESIVE LAYER AND ADHESIVE SHEET

This is a Continuation of application Ser. No. 14/412,966 filed Jan. 5, 2015, which is a national phase of PCT/JP2013/068402 filed Jul. 4, 2013, which claims priority to JP 2012-150913 filed Jul. 4, 2012, JP 2012-197367 filed Sep. 7, 2012, and JP 2013-120254 filed Jun. 6, 2013. The disclosure of the prior applications is hereby incorporated by reference herein in its entirety.

TECHNICAL FIELD

The present invention relates to a pressure-sensitive or bonding adhesive layer for use in the application of a repairing or reinforcing sheet to concrete, and a pressure-sensitive or bonding adhesive sheet having the pressure-sensitive or bonding adhesive layer.

BACKGROUND ART

In recent years, repair and reinforcement of concrete have been carried out according to need from the viewpoints of durability and safety of concrete (also called a concrete structure). The repair and reinforcement of the concrete have been usually carried out by recoating an adhesive, a coating material or the like a plurality of times onto a portion that should be repaired or reinforced, or by bonding a sheet for repair or reinforcement purposes. The repairing or reinforcing sheet is preferably used from the viewpoints of preventing concrete deterioration factors such as water, oxygen, carbon dioxide, or chloride ions from entering the concrete and, at the same time, reinforcing concrete that, due to a deterioration, has a lowered strength. Various proposals have hitherto been made on techniques for concrete repair or reinforcement.

Japanese Patent Application Laid-Open No. 144360/2010 proposes a technique for a concrete repairing method that includes applying a concrete repairing sheet to a surface of concrete to be repaired with an adhesive for construction, the concrete repairing sheet including an intermediate layer having a resin film and a surface layer formed of a woven fabric material stacked on both sides of the intermediate layer through an adhesive resin, and then coating a coating material on the surface layer of the concrete repairing sheet remote from the surface which has been applied to the concrete. The claimed advantage of this technique is that, since the surface layer that comes into contact with the concrete surface is formed of a woven fabric material having a large surface area, even when the concrete surface is a vertical surface or a ceiling surface, the concrete repairing sheet is less likely to be dropped or separated before complete curing of the adhesive for construction and, further, the quality of the construction is high. Further, since the adhesive for construction is completely shielded from the coating material through the concrete repairing sheet, there is no need to wait for curing of the adhesive for construction for coating of the coating material, contributing to a shortened construction time.

Japanese Patent Application Laid-Open No. 27718/2004 proposes a technique for a repairing, reinforcing, or deterioration preventive sheet for concrete structures, the sheet including a protective layer and an adhesive coating layer bonded to each other, and an adhesive layer of a pressure-sensitive adhesive or a hot-melt adhesive provided on the adhesive coating layer on its surface to be bonded to concrete structures. This technique is advantageous in that a reduction in repairing or reinforcing work for preventing peeling-off of concrete, shortening of a time necessary for the repairing or reinforcing work, and the stabilization of the quality can be realized by applying the repairing, reinforcing, or deterioration preventive sheet to a portion to be repaired on site.

PRIOR ART DOCUMENTS

Patent Documents

Patent Document 1: Japanese Patent Application Laid-Open No. 144360/2010
Patent Document 2: Japanese Patent Application Laid-Open No. 27718/2004

SUMMARY OF THE INVENTION

Problems to be Solved by the Invention

The technique proposed in Japanese Patent Application Laid-Open No. 144360/2010 suffers from a problem of poor workability due to the fact that, in repairing work of concrete, the adhesive for construction is coated onto the concrete or the concrete repairing sheet. Further, in the technique, since the coverage of the adhesive for construction cannot be even, the reproducibility of the repairing work is disadvantageously lowered.

In the technique proposed in Japanese Patent Application Laid-Open No. 27718/2004, since the adhesive layer is formed of a pressure-sensitive adhesive or a hot-melt adhesive, for example, when the adhesive layer is formed of a pressure-sensitive adhesive, the adhesion is disadvantageously unsatisfactory. On the other hand, when the adhesive layer is formed of a hot-melt adhesive, since the adhesive is softened by heating in bonding, difficulties are encountered in bonding the sheet to a concrete surface that is a vertical surface or a ceiling surface.

The present invention has been made in view of the problems involved in the prior art, and an object of the present invention is to provide a pressure-sensitive or bonding adhesive layer that, in applying a repairing or reinforcing sheet to an adherend such as concrete, can temporarily fix the sheet to the adherend and the repair or reinforcement of the adherend can easily be carried out, and a pressure-sensitive or bonding adhesive sheet having the pressure-sensitive or bonding adhesive layer.

Means for Solving the Problems

According to one aspect of the present invention, there is provided a pressure-sensitive or bonding adhesive layer comprising an acrylic resin having a glass transition temperature of 15° C. or below and further comprising a liquid epoxy resins, a solid epoxy resin, and a curing agent.

In a preferred embodiment of the present invention, the pressure-sensitive or bonding adhesive layer is used for pressure-sensitive bonding of a repairing or reinforcing sheet to concrete.

In a preferred embodiment of the present invention, the content of the acrylic resin is 4% by mass to 50% by mass based on the total amount of the acrylic resin, the liquid epoxy resin and the solid epoxy resin.

In a preferred embodiment of the present invention, the content of the liquid epoxy resin is 20% by mass to 80% by mass based on the total amount of the liquid epoxy resin and the solid epoxy resin.

In a preferred embodiment of the present invention, the liquid epoxy resin and the solid epoxy resin are bisphenol A epoxy resins.

According to another aspect of the present invention, there is provided a pressure-sensitive or bonding adhesive sheet comprising: a pressure-sensitive or bonding adhesive layer; and a separation film provided on one surface of the pressure-sensitive or bonding adhesive layer.

In an embodiment of the present invention, another separation film may be provided on a surface of the pressure-sensitive or bonding adhesive layer on which the separation film is not provided.

According to a further aspect of the present invention, there is provided a pressure-sensitive or bonding adhesive sheet comprising: a pressure-sensitive or bonding adhesive layer; and a repairing or reinforcing sheet provided on one surface of the pressure-sensitive or bonding adhesive layer.

In an embodiment of the present invention, another separation film is provided on a surface of the pressure-sensitive or bonding adhesive layer on which the repairing or reinforcing sheet is not provided.

Effect of the Invention

According to the present invention, in applying a repairing or reinforcing sheet to adherends such as concrete, the repairing or reinforcing sheet can be temporarily fixed to the adherends by virtue of pressure-sensitive or bonding adhesive properties and bonding properties possessed by a pressure-sensitive or bonding adhesive layer, and, thus, the repair or reinforcement of adherends can easily be carried out.

MODE FOR CARRYING OUT THE INVENTION

Figure 1:
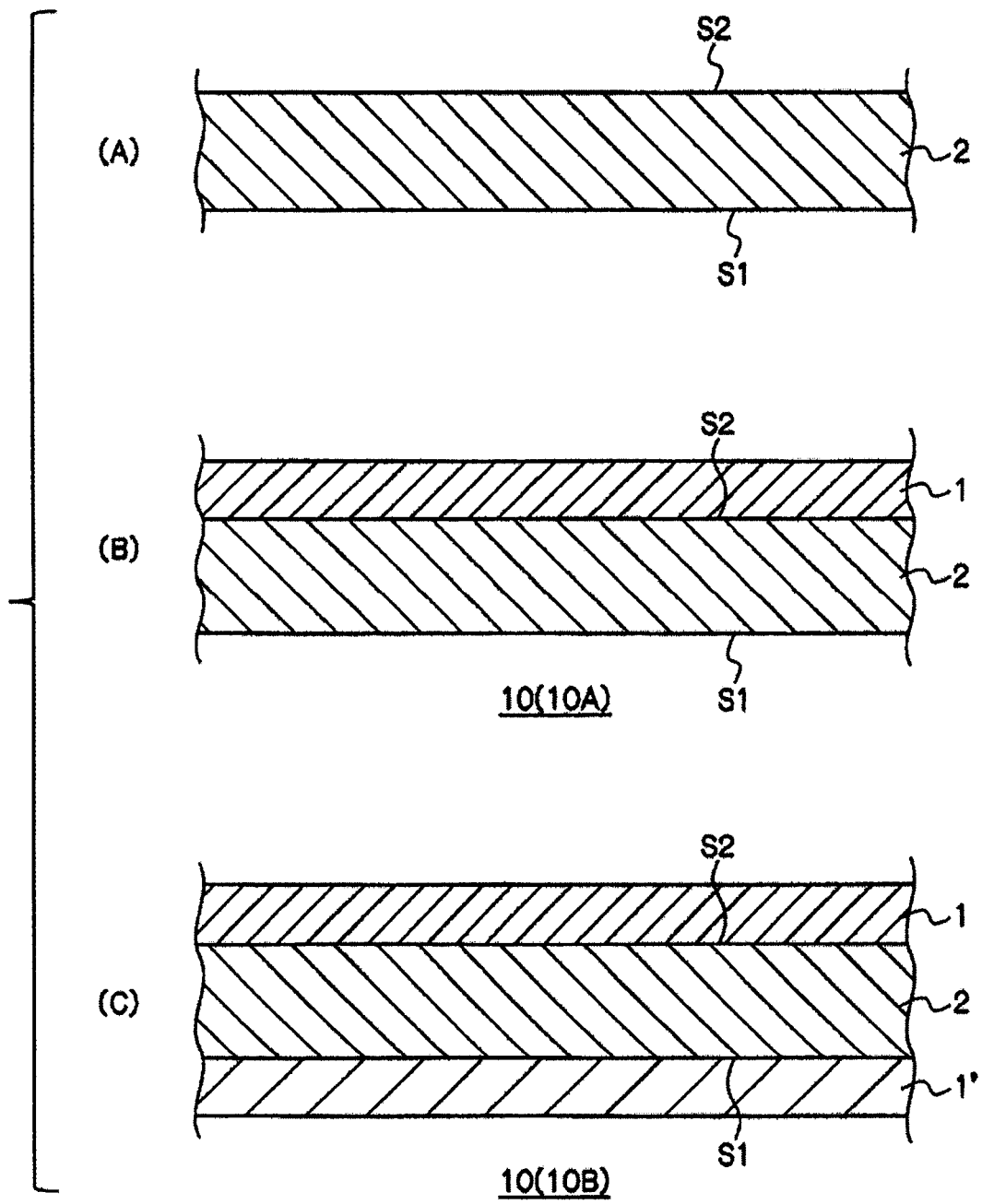
FIG. 1 is a typical cross-sectional view of an example of a pressure-sensitive or bonding adhesive layer according to the present invention (FIG. 1A) and examples of a pressure-sensitive or bonding adhesive sheet including a pressure-sensitive or bonding adhesive layer and a separation film (FIGS. 1B and 1C).

Embodiments of the pressure-sensitive or bonding adhesive layer and the pressure-sensitive or bonding adhesive sheet according to the present invention will be described in more detail. However, it should be noted that the present invention is not limited to the following embodiments, and various modifications are possible within the scope of the subject matter of the present invention.

A pressure-sensitive or bonding adhesive layer 2 according to the present invention contains an acrylic resin having a glass transition temperature of 15° C. or below and further contains a liquid epoxy resin, a solid epoxy resin, and a curing agent. As shown in FIG. 1A, the pressure-sensitive or bonding adhesive layer 2 per se constitutes the present invention, and, further, as shown in FIGS. 1B and 1C, FIG. 2, and FIG. 3, the pressure-sensitive or bonding adhesive sheet 10 (10A to 10G) including the pressure-sensitive or bonding adhesive layer 2 as well constitutes the present invention. In the pressure-sensitive or bonding adhesive layer 2 and the pressure-sensitive or bonding adhesive sheet 10 including the pressure-sensitive or bonding adhesive layer 2, when the repairing or reinforcing sheet is applied to an adherend such as concrete through the pressure-sensitive or bonding adhesive layer 2, the repairing or reinforcing sheet can be temporarily fixed to the adherend through the pressure-sensitive or bonding adhesive layer 2, thereby facilitating the repair or reinforcement of the adherend.

Constituent elements of the pressure-sensitive or bonding adhesive layer 2 and the pressure-sensitive or bonding adhesive sheet 10 will be described in more detail. Adherends to be applied to the repairing or reinforcing sheet are preferably concrete. Further, other adherends to be repaired or reinforced, for example, mortar or fiber reinforced cement may also be possible. In the following description, concrete is used as the adherend.

[Pressure-Sensitive or Bonding Adhesive Layer]

The pressure-sensitive or bonding adhesive layer 2 contains an acrylic resin having a glass transition temperature of 15° C. or below and further contains a liquid epoxy resin, a solid epoxy resin, and a curing agent. The pressure-sensitive or bonding adhesive layer 2 containing the resin component has a pressure-sensitive or bonding adhesive force suitable for temporarily fixing the repairing or reinforcing sheet. As a result, the repairing or reinforcing sheet can be temporarily fixed to concrete through the pressure-sensitive or bonding adhesive layer 2. Further, since the pressure-sensitive or bonding adhesive layer 2 has pressure-sensitive or bonding adhesive properties suitable for temporal bonding, after temporal fixation of the repairing or reinforcing sheet to concrete through the pressure-sensitive or bonding adhesive layer 2, the sheet can be separated and again fixed. Furthermore, bonding properties can be imparted to the pressure-sensitive or bonding adhesive layer 2 by subjecting the pressure-sensitive or bonding adhesive layer 2 containing the resin component to heating, ultraviolet irradiation or other treatment, and, thus, the temporarily fixed repairing or reinforcing sheet as such can be strongly bonded to the concrete through the pressure-sensitive or bonding adhesive layer 2. Further, since the pressure-sensitive or bonding adhesive layer 2 has pressure-sensitive or bonding adhesive properties and bonding properties, even when the concrete surface is a vertical surface or a ceiling surface, the repairing or reinforcing sheet can be temporarily fixed or fixed through the pressure-sensitive or bonding adhesive layer 2.

The pressure-sensitive or bonding adhesive layer 2 is applied so that one surface thereof is bonded by pressure-sensitive bonding to concrete while a repairing or reinforcing sheet is applied to the other surface. The temporary fixation or the fixation may be temporary fixation or fixation of the pressure-sensitive or bonding adhesive layer 2 to concrete or may be temporary fixation or fixation of a repairing or reinforcing sheet to the pressure-sensitive or bonding adhesive layer 2. In the present application, the "pressure-sensitive or bonding adhesion" means the possession of both pressure-sensitive adhesive properties and bonding properties, and the pressure-sensitive adhesion means a temporary bonding phenomenon and is sometimes distinguished from bonding that means a permanent bonding phenomenon (Physicochemical Dictionary, 5th version, Iwanami Shoten). The pressure-sensitive or bonding adhesive layer 2 in an applied form is in a pressure-sensitive bonded state. Therefore, the pressure-sensitive or bonding adhesive layer 2 after the application is cured, for example, by heating or ultraviolet light irradiation to convert the pressure-sensitive or bonding adhesive layer 2 to a bonded state. At that time, for example, heating, ultraviolet irradiation, or electron beam irradiation may be mentioned as a method that cures the pressure-sensitive or bonding adhesive layer 2 for bonding. These curing methods are sometimes called "heating or the like".

The pressure-sensitive or bonding adhesive layer 2 is a layer or sheet formed using a composition for pressure-sensitive or bonding adhesive layer formation. As with a pressure-sensitive or bonding adhesive sheet 10 that will be described later, the pressure-sensitive or bonding adhesive layer 2 is generally provided on a separation film 1, and, after the application of the pressure-sensitive or bonding adhesive layer 2 to concrete or after the application of the repairing or reinforcing sheet 3 to the pressure-sensitive or bonding adhesive layer 2, the separation film 1 is separated for use. The composition for pressure-sensitive or bonding adhesive layer formation is a resin composition that forms the pressure-sensitive or bonding adhesive layer 2, for example, by coating.

(Acrylic Resin)

The acrylic resin functions to impart a practicable pressure-sensitive adhesive strength to the pressure-sensitive or bonding adhesive layer 2 and to improve coatability and film forming properties in the formation of the pressure-sensitive or bonding adhesive layer 2. The acrylic resin is not particularly limited as long as the glass transition temperature is 15° C. or below, and, for example, acrylic ester copolymers having a glass transition temperature of 15° C. or below may be used as the acrylic resin. Examples of comonomers of the acrylic ester copolymer having a glass transition temperature of 15° C. or below include acrylic ester monomers such as methyl acrylate, ethyl acrylate, propyl acrylate, isopropyl acrylate, isobutyl acrylate, n-hexyl acrylate, octyl acrylate, 2-ethylhexyl acrylate, and lauryl acrylate; functional group-containing monomers such as maleic acid, itaconic acid, 2-hydroxyethyl acrylate, 2-hydroxypropyl acrylate, acrylamide, N-methylol acrylamide, n-butoxy-N-methylol acrylamide, sodium 2-acrylamide-2-methyl-1-propanesulfonate, diacetone acrylamide, and glycidyl acrylate; and monomers such as styrene, vinyltoluene, vinyl acetate, acrylonitrile, vinyl chloride, vinylidene chloride, and ethyl vinyl ether. The acryic ester copolymer is a copolymer of these comonomers.

Among these monomer components, acrylic ester copolymers, comonomers of which are compounds having an epoxy, hydroxyl, carboxyl, or nitrile group as a functional group, are preferred. The acrylic ester copolymer can improve the adhesive strength to concrete. Specific examples thereof include ethyl acrylate-butyl acrylate-acrylonitrile copolymer, ethyl acrylate-acrylonitrile copolymer, and butyl acrylate-acrylonitrile copolymer. In the present application, "acrylic acids" such as methyl acrylate and ethyl acrylate include "methacrylic acids" such as methyl methacrylate and ethyl methacrylate.

Preferred acrylic ester copolymers are block copolymers. Among them, triblock copolymers of methacrylate-acrylate-methacrylate are preferred. Block copolymers are preferred from the viewpoints of imparting a practical strength of adhesion to concrete and improving the heat resistance of the pressure-sensitive or bonding adhesive layer 2. Examples of methacrylates constituting the triblock copolymer include methyl methacrylate, ethyl methacrylate, propyl methacrylate, butyl methacrylate, lauryl methacrylate, 2-ethylhexyl methacrylate, cyclohexyl methacrylate, and benzydyl methacrylate. Examples of acrylates constituting the triblock copolymer include methyl acrylate, ethyl acrylate, propyl acrylate, butyl acrylate, lauryl acrylate, 2-ethylhexyl acrylate, cyclohexyl acrylate, and benzydyl acrylate. Specific examples of triblock copolymers of methacrylate-acrylate-methacrylate include methyl methacrylate-butyl acrylate-methyl methacrylate triblock copolymers.

The acrylic resin having a glass transition temperature of 15° C. or below can impart practicable pressure-sensitive adhesive properties to the pressure-sensitive or bonding adhesive layer 2. The lower limit of the glass transition temperature of the acrylic resin is not particularly limited. Preferably, however, the glass transition temperature is in the range of −45° C. to 15° C. from the viewpoint of imparting a practical strength of adhesion. When the glass transition temperature is above 15° C., there is a possibility that practical pressure-sensitive adhesive properties cannot be developed. Practical or practicable pressure-sensitive adhesive properties mean that the adhesive strength (N/25 mm) as determined by the adhesive strength measurement carried out in working examples that will be described later is approximately not less than 0.4 N/25 mm and not more than 5 N/25 mm, preferably not more than 4 N/25 mm. The glass transition temperature can be measured, for example, by a dynamic viscoelasticity measurement method according to JIS K 7244-1 with a solid viscoelasticity analyzer (manufactured by T.A. Instruments, model: RSA-III). The glass transition temperature is expressed in Tg (° C.).

The mass average molecular weight (Mw) of the acrylic resin is preferably in the range of 150000 to 1500000, more preferably 400000 to 1200000. The use of the acrylic resin having a mass average molecular weight (Mw) in this range is advantageous in that the initial adhesive strength of the pressure-sensitive or bonding adhesive layer 2 can easily be regulated and, at the same time, the aggregation force of the pressure-sensitive or bonding adhesive layer 2 can be enhanced. The mass average molecular weight is a value as determined using polystyrene as a standard by gel permeation chromatography (GPC).

The content of the acrylic resin is preferably 4% by mass to 50% by mass based on the total content of the acrylic resin, the liquid epoxy resin, and the solid epoxy resin. When the content is in the above-defined range, a pressure-sensitive adhesive strength suitable for practical use and a high adhesive strength can be imparted to the pressure-sensitive or bonding adhesive layer 2. When the content of the acrylic resin is less than 4% by mass, the pressure-sensitive adhesive strength of the pressure-sensitive or bonding adhesive layer 2 is lowered. As a result, in some cases, the pressure-sensitive or bonding adhesive layer 2 cannot be applied to concrete, or a repairing or reinforcing sheet cannot be applied to the pressure-sensitive or bonding adhesive layer 2. Further, in some cases, the coatability and the film formability of the composition for pressure-sensitive or bonding adhesive layer 2 formation is lowered, making it impossible to form the pressure-sensitive or bonding adhesive layer 2. On the other hand, when the content of the acrylic resin is more than 50% by mass, the adhesive strength of the pressure-sensitive or bonding adhesive layer 2 after curing through heating, ultraviolet light irradiation or the like is sometimes lowered. The content of the acrylic resin is preferably 5% by mass to 34% by mass.

As described above, the pressure-sensitive or bonding adhesive layer 2 contains an acrylic resin having a glass transition temperature of 15° C. or below and thus exhibits, for example, a pressure-sensitive adhesive strength in a range suitable for practical use, that is, 0.4 N/25 mm to 5

N/25 mm. Therefore, for example, even when the concrete surface is a vertical surface or a ceiling surface, a method can be adopted in which a pressure-sensitive or bonding adhesive layer 2 is applied and, further, a repairing or reinforcing sheet is applied through the pressure-sensitive or bonding adhesive layer 2. Further, the once applied pressure-sensitive or bonding adhesive layer 2 can be separated and again applied, and, furthermore, the repairing or reinforcing sheet applied through the pressure-sensitive or bonding adhesive layer 2 can be separated and again applied.

The acrylic resin contained in the pressure-sensitive or bonding adhesive layer 2 functions to lower the concentration of the liquid epoxy resin and the solid epoxy resin in the pressure-sensitive or bonding adhesive layer 2. As a result, since the acrylic resin functions to delay a curing reaction of the epoxy resins, the pot life of the pressure-sensitive or bonding adhesive layer 2 can be improved, and the storage stability of the pressure-sensitive or bonding adhesive layer 2 can be improved.

(Liquid Epoxy Resin)

The liquid epoxy resin functions to impart a practicable pressure-sensitive adhesive strength and a high adhesive strength to the pressure-sensitive or bonding adhesive layer 2. Various epoxy resins may be used without particular limitation as long as the epoxy resin is liquid at room temperature. For example, one of or at least two of resins selected from bisphenol A epoxy resins, bisphenol F epoxy resins, biphenyl epoxy resins, hydrogenated bisphenol A epoxy resin, aliphatic epoxy resins, stilbene epoxy resins, o-cresol novolak epoxy resins, phenol novolak epoxy resins, modified phenol epoxy resins, triphenolmethane epoxy resins, alkyl modified triphenolmethane epoxy resins, triazine nucleus-containing epoxy resins, naphthalene epoxy resins, dicyclopentadiene epoxy resins, dicyclopentadiene modified phenol epoxy resin, and glycidylamine epoxy resins may be mentioned as the epoxy resin.

Among them, bisphenol epoxy resins such as bisphenol A epoxy resin and bisphenol F epoxy resins are preferred, for example, from the viewpoint of improving mechanical strength, curability, heat resistance, and adhesion. Bisphenol A epoxy resins are particularly preferred. In the bisphenol A epoxy resins, those containing one to three bisphenol skeletons in a main chain thereof are preferred because they are liquid at room temperature. In the present application, the room temperature means 23° C.±2° C.

Preferably, the liquid epoxy resin has a mass average molecular weight (Mw) of 300 to 2000. The liquid epoxy resin having a mass average molecular weight (Mw) in the range of 300 to 2000 is preferred because of good compatibility with the acrylic resin. Preferably, the liquid epoxy resin has an epoxy equivalent (g/eq.) of 100 (inclusive) to 800 (exclusive). The liquid epoxy resin having an epoxy equivalent in the above-defined range is preferred, because high durability can be imparted to the pressure-sensitive or bonding adhesive layer 2 after curing, for example, by heating or ultraviolet light irradiation and high adhesive strength can be imparted. The epoxy equivalent refers to the number of grams of resin containing 1 gram equivalent epoxy groups as measured by a method according to JIS K 7236.

The content of the liquid epoxy resin is preferably 20% by mass to 80% by mass, more preferably 25% by mass to 75% by mass, based on the total amount of the liquid epoxy resin and the solid epoxy resin. When the content of the liquid epoxy resin is in the above-defined range, a pressure-sensitive adhesive strength suitable for practical use and a high adhesive strength can be imparted to the pressure-sensitive or bonding adhesive layer 2. When the content of the liquid epoxy resin is less than 20% by mass, the pressure-sensitive adhesive strength of the pressure-sensitive or bonding adhesive layer 2 is lowered, sometimes making it impossible to apply the pressure-sensitive or bonding adhesive layer 2 to concrete or sometimes making it impossible to apply a repairing or reinforcing sheet to the pressure-sensitive or bonding adhesive layer 2. When the content of the liquid epoxy resin is more than 80% by mass, the aggregation force of the pressure-sensitive or bonding adhesive layer 2 is likely to be lowered, sometimes leading to lowered separability of the pressure-sensitive or bonding adhesive layer 2 or lowered adhesive strength of the pressure-sensitive or bonding adhesive layer 2 after curing, for example, by heating or ultraviolet light irradiation.

(Solid Epoxy Resin)

The solid epoxy resin functions to impart a high adhesive strength to the pressure-sensitive or bonding adhesive layer 2 after curing, for example, by heating or ultraviolet light irradiation and, at the same time, to impart a high aggregation force to the pressure-sensitive or bonding adhesive layer 2. Various epoxy resins may be used without particular limitation as long as they are solid at room temperature. One of or at least two of epoxy resins selected from bisphenol A epoxy resins, bisphenol F epoxy resins, o-cresol novolak epoxy resins, phenol novolak epoxy resins, modified phenol epoxy resins, naphthalene epoxy resins, triphenolmethane epoxy resins, alkyl modified triphenolmethane epoxy resins, triazine nucleus-containing epoxy resins, dicyclopentadiene epoxy resins, glycidylamine epoxy resins, biphenyl epoxy resins, biphenylaralkyl epoxy resins, hydrogenated bisphenol A epoxy resin, aliphatic epoxy resins, stilbene epoxy resins, and bisphenol A novolak epoxy resins may be mentioned as the epoxy resin.

Among them, bisphenol epoxy resins such as bisphenol A epoxy resin and bisphenol F epoxy resins are preferred, for example, from the viewpoints of mechanical strength, curability, heat resistance, and adhesion, and bisphenol A epoxy resins are particularly preferred. Bisphenol A epoxy resins that usually have 2 to 10 bisphenol skeletons in a main chain thereof are solid at room temperature.

Preferably, the solid epoxy resin has a mass average molecular weight (Mw) of 300 to 5000. Solid epoxy resins having a mass average molecular weight (Mw) in the above-defined range have a good compatibility with the acrylic resin. The mass average molecular weight is more preferably 800 to 3000, and, when the mass average molecular weight is in this range, for example, a high adhesive strength and a high durability can be imparted to the pressure-sensitive or bonding adhesive layer 2. Preferably, the solid epoxy resin has an epoxy equivalent (g/eq.) of 100 to 2200. Solid epoxy resins having an epoxy equivalent in the above-defined range are preferred because they can impart a high durability to the pressure-sensitive or bonding adhesive layer 2 after curing, for example, by heating or ultraviolet light irradiation and can impart a high adhesive strength.

As with the liquid epoxy resin, the content of the solid epoxy resin is preferably 20% by mass to 80% by mass, more preferably 25% by mass to 75% by mass, based on the total amount of the liquid epoxy resin and solid epoxy resin. When the content is in the above-defined range, a pressure-sensitive adhesive strength suitable for practical use and a high adhesive strength can be imparted to the pressure-sensitive or bonding adhesive layer 2. When the content of the solid epoxy resin is less than 20% by weight, the aggregation force of the pressure-sensitive or bonding adhesive layer 2 is likely to be lowered, sometimes leading to lowered separability of the pressure-sensitive or bonding adhesive layer 2 or lowered adhesive strength of the pressure-sensitive or bonding adhesive layer 2 after curing, for example, by heating or ultraviolet light irradiation. When the content of the solid epoxy resin is more than 80% by mass, the pressure-sensitive adhesive strength of the pressure-sensitive or bonding adhesive layer 2 is lowered, sometimes making it impossible to apply the pressure-sensitive or bonding adhesive layer 2 to concrete or sometimes making it impossible to apply a repairing or reinforcing sheet to the pressure-sensitive or bonding adhesive layer 2.

In the present invention, a liquid epoxy resin and a solid epoxy resin are contained in the pressure-sensitive or bonding adhesive layer 2. Since these epoxy resins are heat-curable resin components, after curing of the pressure-sensitive or bonding adhesive layer 2 having pressure-sensitive adhesive properties, for example, by heating or ultraviolet light irradiation, the pressure-sensitive or bonding adhesive layer 2 exhibits a high adhesive strength. Thus, the pressure-sensitive or bonding adhesive layer 2 can be strongly bonded to concrete, and, further, a repairing or reinforcing sheet can be strongly bonded to the pressure-sensitive or bonding adhesive layer 2. Further, the heat resistance is enhanced. A high adhesive strength can be imparted to the pressure-sensitive or bonding adhesive layer 2 having the composition, for example, by heating or ultraviolet light irradiation. Thus, even when the concrete surface is a vertical surface or a ceiling surface, a high level of adhesive properties can be imparted to the pressure-sensitive or bonding adhesive layer 2, for example, by subjecting the pressure-sensitive or bonding adhesive layer 2 to heating or ultraviolet light irradiation after temporal fixation or second temporal fixation after re-application to the surface. As a result, execution works such as temporal fixation and main fixation of the pressure-sensitive or bonding adhesive layer 2 can easily be carried out, and a repairing or reinforcing sheet can be applied with a high strength.

(Curing Agent)

Any curing agent that can cure the liquid epoxy resin and the solid epoxy resin can be used without particular limitation. The curing agent may be one that cures the pressure-sensitive or bonding adhesive layer 2 by applying heat, or one that cures the pressure-sensitive or bonding adhesive layer 2 by application of ultraviolet light or electron beams. Further, a curing catalyst that generates a base through ultraviolet or electron beam irradiation can be used in combination with the curing agent.

Curing agents that cures the pressure-sensitive or bonding adhesive layer 2 by heating include, for example, amine-based curing agents, phenol-based curing agents, imidazole-based curing agents, and acid anhydride-based curing agents. Among the curing agents, the use of latent curing agents is preferred. The latent curing agent is a curing agent that does not react with an epoxy group until the temperature reaches a given temperature, but causes a reaction with the epoxy group when the temperature reaches an activation temperature by heating. Examples of latent curing agents include, for example, neutral salts or complexes, blocking compounds, high-melting compounds, and microcapsule sealed substances of acidic or basic compounds that can cure epoxy resins through a reaction with epoxy resins. More specific examples thereof include dicyandiamides, hydrazide-based curing agents, amine adduct-based curing agents, and imidazole-based curing agents. When the latent curing agent is used, the pot life of the pressure-sensitive or bonding adhesive layer 2 can be improved, contributing to improved storage stability of an uncured pressure-sensitive or bonding adhesive layer 2 before heating.

The content of curing agents that can cure the pressure-sensitive or bonding adhesive layer 2 by heating may vary depending upon the type of the curing agent. The content of catalytic reaction-type curing agents such as imidazole-based curing agent is preferably 1% by mass to 20% by mass based on the total amount of the liquid epoxy resin and the solid epoxy resin. Further, the content of curing agents that react with epoxy resins in an equivalent reaction, for example, phenol-based curing agents and acid anhydride-based curing agents is preferably 0.8 to 1.2 equivalents based on the epoxy equivalent of the liquid epoxy resin and the solid epoxy resin.

Curing agents that cure the pressure-sensitive or bonding adhesive layer 2 by ultraviolet light or electron beam irradiation are those that release substances which initiate cationic polymerization, for example, by ultraviolet light or electron beam irradiation and optionally applying heat. Curing agents that initiate cationic polymerization include, for example, sulfonic esters, imide sulfonate, dialkyl-4-hydroxysulfonium salts, arylsulfonic acid-p-nitrobenzyl esters, silanol-aluminum complexes, aromatic iodonium salts, aromatic sulfonium salts, aromatic diazonium salts, aromatic phosphonium salts, triazine compounds and iron arene complexes. These curing agents may be used solely or in a combination of two or more. Suitable commercially available products of such curing agents include, for example, SAN-AID SI-60L (manufactured by Sanshin Chemical Industry Co., Ltd.), SAN-AID SI-80L (manufactured by Sanshin Chemical Industry Co., Ltd.), SAN-AID SI-100L (manufactured by Sanshin Chemical Industry Co., Ltd.), CI-2064 (manufactured by Nippon Soda Co., Ltd.), Irgacure 261 (manufactured by Chiba Specialty Chemicals K.K.), Adeka Optomer SP-150 (manufactured by ADEKA), and Adeka Optomer SP-170 (manufactured by ADEKA).

A combination of a mercapto group-containing curing agent (a polythiol-based curing agent) or a phenolic hydroxyl group-containing curing agent with a curing catalyst that generates a base by ultraviolet or electron beam irradiation may be used as the curing agent. Photobase generators are preferred as the curing catalyst. Since the photobase generator is a curing catalyst that has little or no basic properties before light irradiation, layer formation is possible.

Examples of preferred photobase generators include photobase generators that are represented by the following chemical formula and generate bases by ultraviolet light or electron beam irradiation and heating. In the following chemical formula, $R^1$ and $R^2$ each independently represent hydrogen or a monovalent organic group and may be the same or different; $R^1$ and $R^2$ may be combined to form a cyclic structure, provided that at least one of $R^1$ and $R^2$ represents a monovalent organic group; and $R^3$, $R^4$, $R^5$, and $R^6$ each represent hydrogen, a halogen, or a monovalent organic group and may be the same or different, or two or more of $R^3$, $R^4$, $R^5$, and $R^6$ may be combined to form a cyclic structure.

[Chemical formula 1]

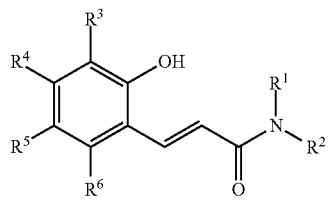

The photobase generator generates a base upon mere application of electromagnetic waves such as ultraviolet light or electron beams. The generation of the base is accelerated by proper heating. Accordingly, a combination of the application of electromagnetic waves such as ultraviolet light or electron beams with heating can effectively generate bases at a low electromagnetic wave irradiation dose. The photobase generator refers to an agent that does not exhibit activity under ordinary temperature and pressure conditions but generates a base upon exposure, for example, to ultraviolet light or electron beams as external stimulus. The photobase generator has the above specific structure. Therefore, upon electromagnetic wave irradiation, a (—CH=CH—C(=O)—) moiety in the chemical formula is isomerized to a cis form, and, further, upon heating, cyclization occurs to generate an amine NHR1R2 that is a base.

When the curing agent that cures the pressure-sensitive or bonding adhesive layer 2 by ultraviolet light or electron beam irradiation is a curing agent that initiates cationic polymerization upon light irradiation, the content of the curing agent is preferably 1% by mass to 10% by mass based on the total amount of the liquid epoxy resin and the solid epoxy resin. When the curing agent that reacts with epoxy resins in an equivalent reaction, for example, phenol-based curing agents and acid anhydride-based curing agents is used, the content of the curing agent is preferably 0.8 to 1.2 equivalents based on the epoxy equivalent of the liquid epoxy resin and the solid epoxy resin. When the curing agent is used in combination with the curing catalyst in an equivalent reaction system of epoxy resins, such as photobase generators, the content is preferably 0.5% by mass to 10% by mass based on the total amount of the liquid epoxy resin and the solid epoxy resin.

The type and content of constituent materials contained in the pressure-sensitive or bonding adhesive layer 2 can be specified, for example, by subjecting the pressure-sensitive or bonding adhesive layer 2 to a gas chromatography mass analysis.

(Other Components)

As long as the object of the present invention is sacrificed, the pressure-sensitive or bonding adhesive layer 2 may optionally contain various additives such as coupling agents for an improvement in adhesion between concrete and the pressure-sensitive or bonding adhesive layer 2 and leveling agents for an improvement in coatability of compositions for pressure-sensitive or bonding adhesive layer formation. Further, the pressure-sensitive or bonding adhesive layer 2 may contain, for example, tackifiers for pressure-sensitive adhesive strength improvement purposes and fillers for shearing strength improvement purposes.

One of or at least two of resins selected from, for example, rosin-based resins, modified rosin-based resins, terpene-based resins, terpene phenol-based resins, aromatic modified terpene-based resins, C5 or C9 petroleum-based resins, and coumarone resins may be mentioned as the tackifier.

One of or at least two of materials selected from, for example, inorganic fillers such as silica, clay, glass balloon, alumina balloon, and ceramic balloon, organic fillers such as nylon beads, acrylic beads, and silicon beads, single fibers formed of, for example, glass, polyester, rayon, nylon, cellulose, and acetate may be mentioned as the filler.

The thickness of the pressure-sensitive or bonding adhesive layer 2 is preferably 150 μm to 500 μm, more preferably 150 μm to 300 μm. The pressure-sensitive or bonding adhesive layer 2 having a thickness in the above-defined range has pressure-sensitive adhesion to concrete and pressure-sensitive adhesion to the repairing or reinforcing sheet and exhibits a high adhesive strength after curing, for example, by heating or ultraviolet irradiation. When the thickness of the pressure-sensitive or bonding adhesive layer 2 is less than 150 μm, since the thickness is so small that the pressure-sensitive adhesive strength and the adhesive strength are sometimes unsatisfactory. On the other hand, a pressure-sensitive or bonding adhesive layer 2 thickness of more than 500 μm is disadvantageous in that curing, for example, after heating or ultraviolet irradiation of the pressure-sensitive or bonding adhesive layer 2 does not satisfactorily proceed, or the curing time is long.

The pressure-sensitive or bonding adhesive layer 2 may be formed by coating a composition for pressure-sensitive or bonding adhesive layer formation on a base and drying the as-coated composition for pressure-sensitive or bonding adhesive layer formation. The composition for pressure-sensitive or bonding adhesive layer formation contains an acrylic resin having a glass transition temperature of 15° C. or below, further contains a liquid epoxy resin, a solid epoxy resin, and a curing agent, and optionally contains the above-described various additives, solvents and the like. The solvent may be optionally contained in any mixing amount for viscosity modification purposes. Such solvents include alcohols such as isopropyl alcohol, methanol, and ethanol; ketones such as methyl ethyl ketone, methyl isobutyl ketone, and cyclohexanone; esters such as ethyl acetate and butyl acetate; halogenated hydrocarbons; aromatic hydrocarbons such as toluene and xylene; or mixtures thereof.

Any base that can form the pressure-sensitive or bonding adhesive layer 2 may be used without particular limitation. However, a separation film 1 subjected to easy-separation treatment is preferred. The separation film 1 will be described in detail in connection with a pressure-sensitive or bonding adhesive sheet 10 that will be described later.

The composition for pressure-sensitive or bonding adhesive layer formation is prepared by mixing the above materials and stirring the mixture for dissolution. The stirrer usable for stirring is not particularly limited, and examples thereof include conventional kneading and dispersing machines, for example, twin roll mills, three-roll mills, pebble mills, trommels, high-speed impeller dispergators, high-speed stone mills, high-speed impact mills, dispers, high-speed mixers, ribbon blenders, cokneaders, intensive mixers, tumblers, blenders, dispersers, homogenizers, and ultrasonic dispergators.

The composition for pressure-sensitive or bonding adhesive layer formation may be coated by any method without particular limitation. Examples of methods using printing include gravure printing, flexo printing, and offset printing. Coating methods include, for example, roll coating, reverse coating, Komma coating, knife coating, die coating, and gravure coating.

The drying of the as-coated composition for pressure-sensitive or bonding adhesive layer formation is preferably carried out under such conditions that the solvent contained in the composition for pressure-sensitive or bonding adhesive layer formation can be satisfactorily volatilized and, at the same time, a lowering in pressure-sensitive adhesive properties due to excessive acceleration of curing of the liquid epoxy resin and the solid epoxy resin does not occur. The drying is genially carried out by holding at a temperature of 50° C. to 100° C. for 2 to 20 min.

As described above, the pressure-sensitive or bonding adhesive layer 2 contains an acrylic resin having a glass transition temperature of 15° C. or below and a liquid epoxy resin and thus has a pressure-sensitive adhesive strength. Consequently, the pressure-sensitive or bonding adhesive layer 2 can be temporarily fixed to concrete, and a repairing or reinforcing sheet can be temporarily fixed to the pressure-sensitive or bonding adhesive layer 2. Further, the pressure-sensitive or bonding adhesive layer 2 and the repairing or reinforcing sheet after the temporal fixation can be separated and again temporarily fixed or fixed. Further, since the pressure-sensitive or bonding adhesive layer 2 contains a liquid epoxy resin and a solid epoxy resin, a high adhesive strength can be imparted, for example, after heating or ultraviolet light irradiation. Consequently, the pressure-sensitive or bonding adhesive layer 2 can be strongly bonded to concrete, and, further, a repairing or reinforcing sheet can be strongly bonded to the pressure-sensitive or bonding adhesive layer 2. Further, the pressure-sensitive or bonding adhesive layer 2 develops a pressure-sensitive adhesive strength and an adhesive strength, and, thus, even when the concrete surface is a vertical surface or a ceiling surface, the pressure-sensitive or bonding adhesive layer 2 can easily be temporarily fixed or fixed to concrete. Furthermore, since a pressure-sensitive or bonding adhesive layer 2 in a sheet form or a pressure-sensitive or bonding adhesive sheet 10 including a pressure-sensitive or bonding adhesive layer 2 is used, there is no need to provide a conventional adhesive in a construction site for repair or reinforcement of concrete, contributing to a reduction in a workload in construction. The pressure-sensitive or bonding adhesive layer 2 or the pressure-sensitive or bonding adhesive sheet 10 including the pressure-sensitive or bonding adhesive layer 2 can be preferably used for concrete repair or reinforcement and can repair or reinforce the concrete.

[Pressure-Sensitive or Bonding Adhesive Sheet]

As shown, for example, in FIGS. 1B and 1C and 2A, a pressure-sensitive or bonding adhesive sheet 10 (10A, 10B, and 10C) includes a pressure-sensitive or bonding adhesive layer 2 as described above and a separation film 1 provided on one surface (S1 or S2) of the pressure-sensitive or bonding adhesive layer 2. The pressure-sensitive or bonding adhesive sheet 10 may be a pressure-sensitive or bonding adhesive sheet 10A, 10C including a separation film 1 on one surface S2 only, or alternatively may be a pressure-sensitive or bonding adhesive sheet 10B including separation films 1, 1' so respective surfaces S1, S2.

For example, as shown in FIGS. 2A and 2B, a pressure-sensitive or bonding adhesive sheet 10 (10C, 10D) includes a pressure-sensitive or bonding adhesive layer 2 as described above and a repairing or reinforcing sheet 3 provided on surface S2 of the pressure-sensitive or bonding adhesive layer 2. The pressure-sensitive or bonding adhesive sheet 10 may be a pressure-sensitive or bonding adhesive sheet 10C including a repairing or reinforcing sheet 3 provided on one surface 82 of the pressure-sensitive or bonding adhesive layer 2 and a separation film 1 provided on the other surface S1 of the pressure-sensitive or bonding adhesive layer 2, or alternatively may be a pressure-sensitive or bonding adhesive sheet 100 including a repairing or reinforcing sheet 3 provided on one surface S2 of the pressure-sensitive or bonding adhesive layer 2, no element being provided on the other surface S1.

Figure 2:
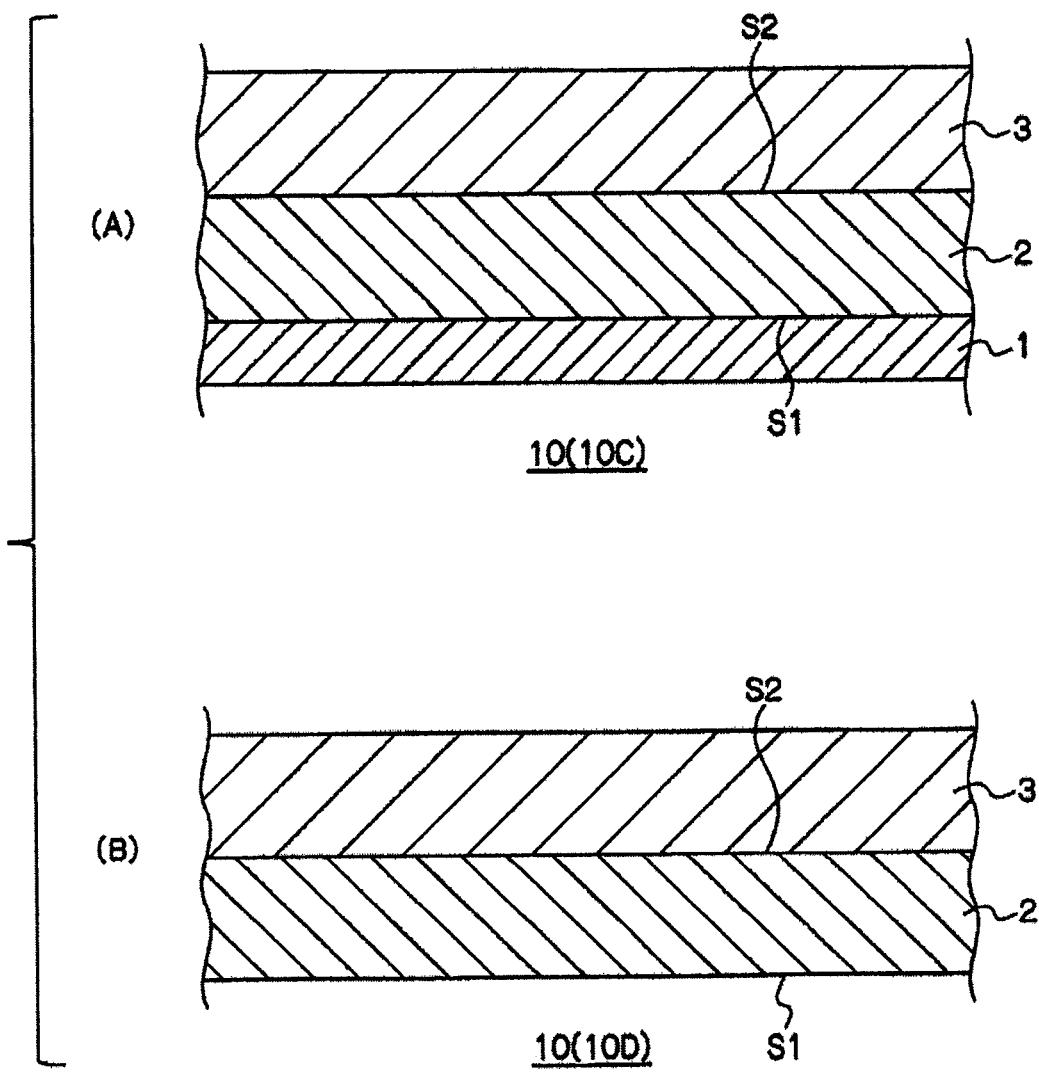
FIG. 2 is a typical cross-sectional view of an example of a pressure-sensitive or bonding adhesive sheet including a pressure-sensitive or bonding adhesive layer according to the present invention and a repairing or reinforcing sheet.
Figure 3:
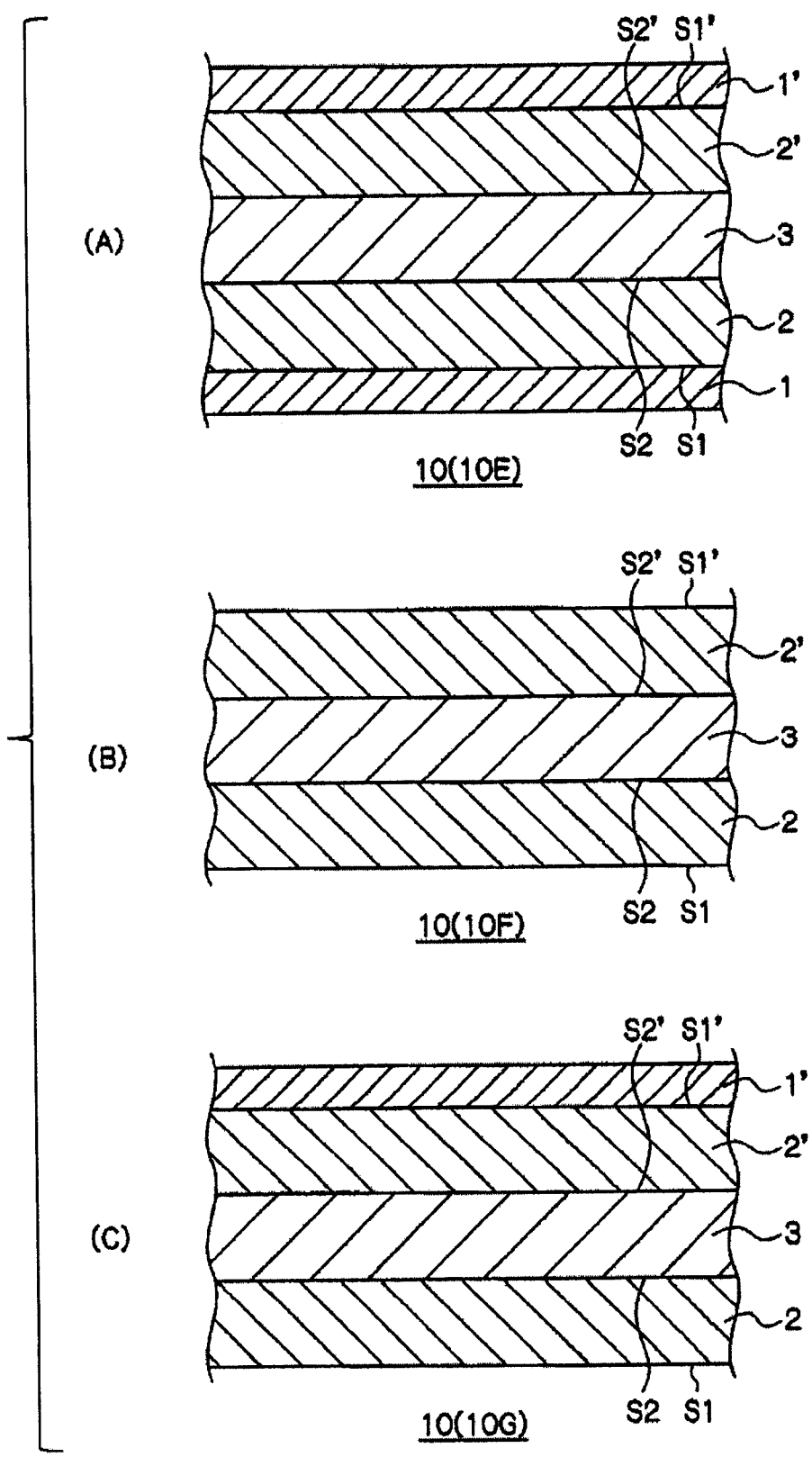
FIG. 3 is a typical cross-sectional view of another example of a pressure-sensitive or bonding adhesive sheet including a pressure-sensitive or bonding adhesive layer according to the present invention and a repairing or reinforcing sheet.

As shown in FIGS. 3A, 3B, and 3C, a pressure-sensitive or bonding adhesive sheet 10 (10E,10F,10G) includes a pressure-sensitive or bonding adhesive layer 2' provided on the repairing or reinforcing sheet 3 constituting the pressure-sensitive or bonding adhesive sheet 10C, 10D shown in FIGS. 2A and 2B. That is, the pressure-sensitive or bonding adhesive sheet 10 shown in FIG. 3 includes the pressure-sensitive or bonding adhesive layer 2, a repairing or reinforcing sheet 3 provided on one surface 82 of the pressure-sensitive or bonding adhesive layer 2, and a pressure-sensitive or bonding adhesive layer 2' provided on the repairing or reinforcing sheet 3. As shown in FIGS. 3A and 3C, a separation film 1' may be provided on the pressure-sensitive or bonding adhesive layer 2', or alternatively, as shown in FIG. 3B, no separation film may be provided on the pressure-sensitive or bonding adhesive layer 2'. The expression "on a repairing or reinforcing sheet 3" refers to on a surface of the repairing or reinforcing sheet 3 remote from the pressure-sensitive or bonding adhesive layer 2. In FIG. 3, reference number S2' designates a surface on the repairing or reinforcing sheet side of the pressure-sensitive or bonding adhesive layer 2', and reference character S1' designates a surface of the pressure-sensitive or bonding adhesive layer 2' remote from the repairing or reinforcing sheet.

The pressure-sensitive or bonding adhesive layer 2' may include the same components as the pressure-sensitive or bonding adhesive layer 2 or components different from the pressure-sensitive or bonding adhesive layer 2.

<Separation Film>

As shown in FIGS. 1 and 2, the separation film 1 is provided on one surface (S1 or S2) or both surfaces (S1 and S2) of the pressure-sensitive or bonding adhesive layer 2. The separation film 1 covers one surface (S1 or S2) or both surfaces (S1 and S2) of the pressure-sensitive or bonding adhesive layer 2 and functions to protect the pressure-sensitive or bonding adhesive layer 2 before use. As shown in FIG. 1B, the separation film 1 may be provided on a surface S2 that is one of surfaces S1, S2 of the pressure-sensitive or bonding adhesive layer 2 and located remote from the surface S1 that is applied to concrete, or alternatively, as shown in FIG. 1C, may be provided on both surfaces, that is, the surface S2 and the surface S1 that is applied to concrete.

As shown in FIGS. 2A and 3A, the separation film 1 may be provided on a surface S1 that is one of surfaces S1, S2 of the pressure-sensitive or bonding adhesive layer 2 and is a surface to be applied to concrete. As shown in FIGS. 3A and 3C, when a pressure-sensitive or bonding adhesive layer 2' is provided on the repairing or reinforcing sheet 3, a separation film 1' may be on the pressure-sensitive or bonding adhesive layer 2'.

In the embodiment shown in FIG. 1B, for example, the pressure-sensitive or bonding adhesive sheet may be in the form of a rolled pressure-sensitive or bonding adhesive sheet 10A like a general pressure-sensitive adhesive tape. In the pressure-sensitive or bonding adhesive sheet 10A, construction may be carried out by applying the surface S1, a surface to be applied to concrete, then separating the separation film 1 provided on the surface S2, a surface remote from the surface S1, and applying a repairing or reinforcing sheet to the exposed pressure-sensitive or bonding adhesive layer 2. On the other hand, in the embodiment shown in FIG. 1C, for example, the pressure-sensitive or bonding adhesive sheet may be in the form of a flat pressure-sensitive or bonding adhesive sheet 10B. In the pressure-sensitive or bonding adhesive sheet 10B, construction may be carried out by separating the separation film 1' on the surface S1, a surface to be applied to concrete, applying the pressure-sensitive or bonding adhesive layer 2 to concrete, then separating the separation film 1 provided on the surface S2, a surface remote from the surface S1, and applying a repairing or reinforcing sheet to the exposed pressure-sensitive or bonding adhesive layer 2. Alternatively, in the pressure-sensitive or bonding adhesive sheet 10B, construction may be carried out by separating the separation film 1 on the surface S2 remote from the surface S1, a surface to be applied to concrete, applying a repairing or reinforcing sheet to the exposed pressure-sensitive or bonding adhesive layer 2, then separating in this state the separation film 1' on the surface S1, a surface to be applied to concrete, and applying the exposed pressure-sensitive or bonding adhesive layer 2 to the concrete. In the following description, the separation film 1 and the separation film 1' are collectively called "separation film 1."

Preferably, the surface of the separation film 1 on the pressure-sensitive or bonding adhesive layer side has been subjected to easy-separation treatment. The separation film 1 subjected to easy-separation treatment can easily be separated, for example, from the pressure-sensitive or bonding adhesive layer 2 after the application of the pressure-sensitive or bonding adhesive layer 2 provided in the pressure-sensitive or bonding adhesive sheet 10 to concrete.

The separation film 1 is not particularly limited, and various films can be used, as long as separation film 1 has a strength and flexibility on such a level that the separation film 1 when provided separably on the surface of the pressure-sensitive or bonding adhesive layer 2 can protect the pressure-sensitive or bonding adhesive layer 2. Materials for the separation film 1 include, for example, publicly known resins such as polyester-based resins, polypropylene-based resins, polyvinyl chloride-based resins, fluorine-based resins, polystyrene-based resins, polyacrylic resins, cellulosic resins, polycarbonate-based resins, polyamide-based resins, polyolefin-based resins, polyvinyl alcohol-based resins, polyimide-based resins, phenol-based resins, and polyurethane-based resins. The separation film 1 may be a synthetic resin film formed of one of these resins, may be a synthetic resin film formed of a combination of two or more reins, or may be a composite film formed of a laminate of synthetic resin films of a single type of resin or a combination of different types of resins.

Among others, the separation film 1 formed of polyester resins or polycarbonate-based resins is preferred, for example, from the viewpoints of transparency, heat resistance, dimensional stability, rigidity, flexibility, suitability for lamination, and cost. Examples of polyester-based resins include polyethylene terephthalate, polyethylene naphthalate, polybutylene terephthalate, polybutylene naphthalate, polyallylate, and polytetraethylene terephthalate. Polyethylene terephthalate is particularly preferred from the viewpoints of handleability and cost.

Preferably, the easy-separation treatment is carried out on the surface of the separation film 1 so that the separation film 1 can easily be separated from the pressure-sensitive or bonding adhesive layer 2. Preferably, for example, a easy-separation layer (not shown) is provided by the easy-separation treatment. The easy-separation layer is provided by coating a separating agent. Various separating agents may be applied without particular limitation. Examples thereof include water-soluble resins, hydrophilic resins, waxes, silicone resins, fluoro resins, aminoalkyd resins, melamine-based resins, polyester resins, and acrylic resins. Any method may be adopted for coating of the separating agent without particular limitation and examples thereof include roll coating, gravure coating, and spray coating.

Preferably, the surface of the separation film 1 on easy-separation layer formation side has been subjected to easy-bonding treatment for easy-separation layer adhesion enhancement purposes. The easy-bonding treatment is preferably treatment that improves the wettability of the separating agent. Examples of such treatment include corona discharge treatment, plasma treatment, ozone treatment, flame treatment, primer treatment, preheat treatment, dust removal treatment, vapor deposition treatment, and alkali treatment.

Any production method of the separation film 1 may be used without particular limitation, and examples thereof include solution casting, melt extrusion, and calendering. A highly separable separation film 1 can be produced by optionally subjecting one surface (S1 or S2) or both surfaces (S1 and S2) of the produced separation film 1 to the easy-separation treatment and the easy-bonding treatment. The thickness of the separation film 1 is not particularly limited and may be, for example, 5 μm to 200 μm.

Commercially available products of the separation film 1 may be used, and examples thereof include 38 μm-thick polyester films (manufactured by Mitsui Chemicals Tohcello, Inc., tradename: SP-PET-01) having one surface subjected to easy-separation treatment with a silicone-based separating agent.

<Repairing or Reinforcing Sheet>

As described in the column of a repairing or reinforcing method that will be described later, the repairing or reinforcing sheet 3 is sometimes used as a sheet separate from the pressure-sensitive or bonding adhesive layer 2 and the pressure-sensitive or bonding adhesive sheet 10. Here, however, an embodiment will be described in which the repairing or reinforcing sheet 3 is integrally provided as a constituent element of the pressure-sensitive or bonding adhesive sheet 10.

As shown in FIGS. 2A and 2B and FIGS. 3A, 3B, and 3C, the repairing or reinforcing sheet 3 may be optionally provided on one surface S2 of the pressure-sensitive or bonding adhesive layer 2 constituting the pressure-sensitive or bonding adhesive sheet 10. As shown, for example, in FIG. 2A, the surface S2 is a surface remote from the surface S1 that is one of surfaces S1, S2 of the pressure-sensitive or bonding adhesive layer 2 and a surface to be applied to concrete. As shown in FIG. 2A and FIG. 3A, a separation film 1 may be provided on the surface S1, a surface to be applied to concrete, or alternatively, as shown in FIG. 2B and FIGS. 3B and 3C, no separation film may be provided. The repairing or reinforcing sheet 3 may be provided on the pressure-sensitive or bonding adhesive layer 2 by a publicly known method such as heat lamination.

In an embodiment shown in FIG. 2A and FIG. 3A, for example, the pressure-sensitive or bonding adhesive sheet may be in the form of a flat pressure-sensitive or bonding adhesive sheet 10C,10E. In the flat pressure-sensitive or bonding adhesive sheet 10C,10E, construction may be carried out by separating the separation film 1 on the surface S1, a surface to be applied to concrete and applying the exposed pressure-sensitive or bonding adhesive layer 2 to concrete. In the pressure-sensitive or bonding adhesive sheet 10C, 10E, the repairing or reinforcing sheet 3 is previously in a pressure-sensitively adhered state to the pressure-sensitive or bonding adhesive layer 2. Thus, the sheet can easily be applied. On the other hand, in an embodiment shown in FIG. 2B and FIGS. 3B and 3C, the pressure-sensitive or bonding adhesive sheet may be in the form of a rolled pressure-sensitive or bonding adhesive sheet 10D,10G. In the pressure-sensitive or bonding adhesive sheet 10D, 10G, construction may be carried out by applying the surface S1, a surface to be applied to concrete, to concrete. Also in the pressure-sensitive or bonding adhesive sheet 10D, 10G, since the repairing or reinforcing sheet 3 is also previously in a pressure-sensitively adhered state to the pressure-sensitive or bonding adhesive layer 2, the sheet can easily be applied.

A pressure-sensitive or bonding adhesive sheet 10 (10E, 10F, 10G) includes a repairing or reinforcing sheet 3 provided on one surface of the pressure-sensitive or bonding adhesive layer 2 and a pressure-sensitive or bonding adhesive layer 2' provided on the repairing or reinforcing sheet 3. Accordingly, when the repairing or reinforcing sheet 3 has, for example, a fiber material layer that will be described later, the pressure-sensitive or bonding adhesive layer 2' can function to absorb irregularities in the fiber material layer to reduce the size of the irregularities. As a result, the smoothness of the pressure-sensitive or bonding adhesive sheet 10 (10E, 10F, 10G) can be enhanced, and, thus, design of the repaired or reinforced concrete can be enhanced.

The pressure-sensitive or bonding adhesive layer 2' can function as a protective layer that prevents a deterioration in the repairing or reinforcing sheet 3. Consequently, the pressure-sensitive or bonding adhesive sheet 10 (10E, 10F, 10G) can enhance storage stability before application to concrete and can enhance durability after application to the concrete.

Further, since pressure-sensitive or bonding adhesive layers (2, 2') are provided on respective surfaces of the repairing or reinforcing sheet 3, the pressure-sensitive or bonding adhesive sheet 10 (10E, 10F, 10G) can function like a pressure-sensitive or bonding adhesive double coated tape. Concrete can be applied to a surface S1 of the pressure-sensitive or bonding adhesive layer 2 in the pressure-sensitive or bonding adhesive sheet 10, and a functional sheet or layer that will be described later can be applied to a surface S1' of the pressure-sensitive or bonding adhesive layer 2'. In the pressure-sensitive or bonding adhesive sheet 10E, 10G, a functional sheet or layer may be provided instead of the separation film 1'.

A sheet or layer having one of or at least two of functions, for example, light resistance, water resistance, antifouling properties, weathering resistance, impact resistance, scratch resistance, acid resistance, alkali resistance, and design may be mentioned as the functional sheet or layer.

Any sheet that can repair or reinforce concrete can be used as the repairing or reinforcing sheet 3 without particular limitation. Examples thereof include sheets that can prevent the penetration of concrete degradation factors, sheets that can reinforce concrete having lowered strength, sheets that have other functions and can repair or reinforce concrete, or sheets that satisfy all the above properties.

For example, a repairing or reinforcing sheet including a base formed of a synthetic resin film, a resin material layer provided on one surface of the base, and a fiber material layer provided on the other surface of the base may be mentioned as the repairing or reinforcing sheet 3. The resin material layer can function as a protective layer, and the fiber material layer can function as a reinforcing layer.

Examples of materials for the synthetic resin film as the base include polyester resins, polypropylene-based resins, polyvinyl chloride-based resins, fluorine-based resins, polystyrene-based resins, polyacrylic resins, cellulosic resins, polycarbonate-based resins, polyimide-based resins, polyolefin-based resins, polyvinyl alcohol-based resins, polyimide-based resins, phenol-based resins, and polyurethane-based resins.

The resin material layer functions to prevent damage to concrete and a bonded portion between the concrete and the pressure-sensitive or bonding adhesive layer 2 caused by external degradation factors. Representative degradation factors include water, oxygen, carbon dioxide, or chloride ions. For example, one of or at least two of resins selected from fluorine-based resins, acrylic resins, acryl silicone-based resins, acryl fluorine-based resins, silicone-based resins, urethane-based resins, and chlorine-based resins may be mentioned as the resin for constituting the resin material layer. These resin materials have weathering resistance, antifouling properties, water resistance, salt shielding properties or other functions according to the types thereof and thus are preferably selected according to the properties.

Examples of the fiber material layer include those formed of one of or at least two of materials selected from woven fabrics, knitted fabrics, non-woven fabrics, layered fabrics, synthetic resin foams, and papers. One of or at least two of materials selected from polyester fibers, polyimide fibers, aramid fibers, vinylon fibers, carbon fibers, glass fibers, and polyolefin fibers may be mentioned as the material for constituting the fiber material layer. Among them, polyester fibers, polyamide fibers, aramid fibers, vinylon fibers, and polyolefin fibers are preferred because of lightness and high strength. These fibers may be blended fabrics, may be those in which warps and wefts are used, or may be laminated to form a multilayered structure. The fiber material layer may be bonded to the synthetic resin film as the base through a resin material. The resin material is not particularly limited, and the same resin materials as used in the resin material layer may be used.

Preferably, the repairing or reinforcing sheet 3 has a strength (a reinforcement strength) high enough to support separated concrete pieces or concrete pieces that are likely to be separated, for example, when a part of a concrete structure has been separated or is likely to be separated. The strength is preferably not less than 1500 N at a displacement of not less than 10 mm, for example, in a punching test specified in former Japan Highway Public Corporation (East Nippon Expressway Company Limited, Central Nippon Expressway. Co., Ltd., and West Nippon Expressway Co., Ltd.).

The repairing or reinforcing sheet 3 can be produced, for example, by a production process including the steps of: providing a resin material layer on one surface of a base; and providing a fiber material layer on the other surface of the base. The resin material layer can be formed on one surface of the base, for example, by coating a resin material on a base and then curing the coating. The fiber material layer can be formed on the other surface of the base, for example, by coating a composite material containing a fiber material and a resin material on a base and curing the resin material.

Here the repairing or reinforcing sheet 3 has been described. However, it should be noted that materials for constituting the sheet vary dependent upon whether the sheet is a repairing sheet or a reinforcing sheet that is selected according to applications. The thickness of the repairing or reinforcing sheet varies dependent upon whether the sheet is used for repair purposes or for reinforcement purposes, but is generally in the range of 0.01 mm to 1.0 mm.

As described above, the pressure-sensitive or bonding adhesive sheet 10 can be used for the repair or reinforcement of concrete by pressure-sensitive adhesion or bonding adhesion to concrete. The pressure-sensitive or bonding adhesive layer 2 constituting the pressure-sensitive or bonding adhesive sheet 10 includes an acrylic resin having a glass transition temperature of 15° C. or below and a liquid epoxy resin and thus has a pressure-sensitive adhesive strength. Consequently, a method may be adopted that includes temporarily fixing one surface of a pressure-sensitive or bonding adhesive layer 2 to concrete, separating the separation film 1, and then temporarily fixing a repairing or reinforcing sheet to the other surface. After the temporal fixation of the pressure-sensitive or bonding adhesive layer 2 and the repairing or reinforcing sheet, the pressure-sensitive or bonding adhesive layer 2 and the repairing or reinforcing sheet may be separated and again temporarily fixed or fixed. Further, in the pressure-sensitive or bonding adhesive sheet 10 including the pressure-sensitive or bonding adhesive layer 2, there is no need to provide a conventional adhesive in a construction site for repair or reinforcement of concrete, contributing to a reduction in a workload in construction. Further, the pressure-sensitive or bonding adhesive sheet 10 including the pressure-sensitive or bonding adhesive layer 2 can be preferably used for concrete repair or reinforcement and can repair or reinforce the concrete.

[Repairing or Reinforcement Method]

The concrete repairing or reinforcement method can be carried out using the pressure-sensitive or bonding adhesive layer 2 and the pressure-sensitive or bonding adhesive sheet 10.

In a pressure-sensitive or bonding adhesive sheet 10A shown in FIG. 1B, construction may be carried out by applying the surface S1, a surface to be applied to concrete, to concrete, then separating the separation film 1 provided on the other surface S2, and applying a repairing or reinforcing sheet to the exposed pressure-sensitive or bonding adhesive layer 2. On the other hand, in a pressure-sensitive or bonding adhesive sheet 10B shown in FIG. 1C, construction may be carried out by separating the separation film 1' on the surface S1, a surface to be applied to concrete, applying the exposed pressure-sensitive or bonding adhesive layer 2 to concrete, then separating the separation film 1 provided on the other surface S2, and applying a repairing or reinforcing sheet to the exposed pressure-sensitive or bonding adhesive layer 2. Further, in the pressure-sensitive or bonding adhesive sheet 10B, construction may be carried out by separating the separation film 1 on the surface S2 remote from the surface S1, a surface to be applied to concrete, applying a repairing or reinforcing sheet to the exposed pressure-sensitive or bonding adhesive layer 2, and, in this state, separating the separation film 1' on the surface S1, the surface to be applied to concrete, and applying the exposed pressure-sensitive or bonding adhesive layer 2 to the concrete.

In a pressure-sensitive or bonding adhesive sheet 10C shown in FIG. 2A, construction may be carried out by separating the separation film 1 on the surface S1, a surface to be applied to concrete, and applying the exposed pressure-sensitive or bonding adhesive layer 2 to the concrete. Since the repairing or reinforcing sheet 3 is previously in a pressure-sensitively adhered state to the pressure-sensitive or bonding adhesive layer 2, the construction can easily be carried out. On the other hand, in a pressure-sensitive or bonding adhesive sheet 10D shown in FIG. 2B, construction may be carried out by applying the surface S1, a surface to be applied to concrete, to concrete. Also in the pressure-sensitive or bonding adhesive sheet 10D, the repairing or reinforcing sheet 3 is previously in a pressure-sensitively adhered state to the pressure-sensitive or bonding adhesive layer 2, and, thus, the construction can easily be carried out.

In a pressure-sensitive or bonding adhesive sheet 10E shown in FIG. 3A, as with the pressure-sensitive or bonding adhesive sheet 100, construction may be carried out by separating the separation film 1 provided on the surface St a surface to be applied to concrete, and applying the exposed pressure-sensitive or bonding adhesive layer 2 to concrete. In the pressure-sensitive or bonding adhesive sheet 10E, thereafter, if necessary, the separation film 1' may be separated followed by the provision of a functional sheet or layer on the exposed pressure-sensitive or bonding adhesive layer 2'. On the other hand, in a pressure-sensitive or bonding adhesive sheet 10F, 10G shown in FIGS. 3B and 3C, as with the pressure-sensitive or bonding adhesive sheet 10D, construction may be carried out by applying the surface S1, a surface to be applied to concrete, to concrete. As with the pressure-sensitive or bonding adhesive sheet 10E shown in FIG. 3A, the pressure-sensitive or bonding adhesive layer 2' is provided, and, thus, a functional film or layer can be provided on the pressure-sensitive or bonding adhesive layer 2'.

Thus, the repairing or reinforcing sheet is applied to concrete by pressure-sensitive adhesion or bonding adhesion using the pressure-sensitive or bonding adhesive sheets 10A to 10G. In this case, preferably, the pressure-sensitive or bonding adhesive layer 2 is contact-bonded to concrete, for example, by a roller from the top of the repairing or reinforcing sheet. Regarding curing of the pressure-sensitive or bonding adhesive layer 2, heat curing and contact bonding can be simultaneously carried out with a heating roller in roller contact bonding, or alternatively, a method may also be adopted in which roller contact bonding is followed by heat curing. The temperature at which the heat curing is carried out may vary depending, for example, upon the type of the curing agent used, but is generally 100° C. to 150° C. Also when curing is carried out by ultraviolet light or electron beam irradiation, for example, a method may be adopted in which ultraviolet light or electron beams are applied for curing simultaneously with or after contact bonding. Conditions for ultraviolet light irradiation may vary depending upon the type of the curing agent, but may be, for example, such that, as described in working examples that will be described later, the integrated quantity of light is about 1000 mJ/cm$^2$ in a wavelength range of 300 nm to 370 nm. Conditions for electron beam irradiation may also vary depending upon the type of the curing agent, but may be such that the irradiation dose is about 50 kGy to 100 kGy.

According to these curing methods, the liquid epoxy resin and the solid epoxy resin contained in the pressure-sensitive or bonding adhesive layer 2 are cured, and, consequently, the pressure-sensitive or bonding adhesive layer 2 is strongly bonded to concrete while the repairing or reinforcing sheet can be strongly bonded to the pressure-sensitive or bonding adhesive layer 2. As a result, the repairing or reinforcing sheet can be strongly bonded to the concrete. After curing of the pressure-sensitive or bonding adhesive layer 2, for example, by heating or ultraviolet irradiation, the cured pressure-sensitive or bonding adhesive layer 2 is held for approximately one day to 14 days. This holding allows the liquid epoxy resin and the solid epoxy resin to be more fully cured, and, consequently, the pressure-sensitive or bonding adhesive layer 2 can develop a higher level of adhesive strength. As a result, the concrete can be repaired or reinforced with a higher strength.

EXAMPLES

The present invention is further illustrated by the following Examples. The present invention, however, is not limited

Example 1

A 38 μm-thick polyester film (manufactured by Mitsui Chemicals Tohcello, Inc., tradename: SP-PET-03) having one surface subjected to easy-separation treatment with a silicone-based separating agent was provided as a separation film 1. A composition A having the following composition for pressure-sensitive or bonding adhesive layer formation was coated by an applicator on the whole area of the surface of the separation film subjected to easy-separation treatment. The coated film was dried in a drying oven at 100° C. for 2 min to form a pressure-sensitive or bonding adhesive layer 2 having a thickness of 150 μm. Subsequently, a 38 μm-thick polyester film (manufactured by Mitsui Chemicals Tohcello, Inc., tradename: SPPET-01) having one surface subjected to easy-separation treatment with a silicone-based separating agent was laminated as another separation film on the other surface of the pressure-sensitive or bonding adhesive layer 2 to obtain a pressure-sensitive or bonding adhesive sheet 10B (see FIG. 1(C)) of Example 1 that has one pressure-sensitive or bonding adhesive layer. The composition A for pressure-sensitive or bonding adhesive layer formation was prepared by mixing a liquid epoxy resin and two curing agents together, stirring the mixture at a rotation speed of 1000 rpm with a disper for 30 min, then mixing a solid epoxy resin, an acrylic resin, and a diluting solvent thereinto, and stirring the mixture with a disper at a rotation speed of 1200 rpm for 30 min.

(Composition A for Pressure-Sensitive or Bonding Adhesive Layer Formation)

| | |
|---|---|
| Acrylic resin (modified methyl methacrylate-butyl acrylate-methyl methacrylate triblock copolymer with hydroxyl group introduced thereinto, Tg: −42° C., manufactured by Arkema Inc., tradename: M22N) | 30 parts by mass |
| Liquid epoxy resin (bisphenol A epoxy resin, Epoxy equivalent: 190 g/eq., manufactured by Mitsubishi Chemical Corporation, tradename: jER828) | 80 parts by mass |
| Solid epoxy resin (bisphenol A epoxy resin, Epoxy equivalent: 480 g/eq., manufactured by Mitsubishi Chemical Corporation, tradename: jER1001) | 120 parts by mass |
| Curing agent (amine-based curing agent, manufactured by Ajinomoto Fine-Techno. Co. Inc., tradename: Amicure MY-H) | 7 parts by mass |
| Curing agent (dicyandimide, manufactured by Mitsubishi Chemical Corporation, tradename: DICY) | 11 parts by mass |
| Diluting solvent (Ethyl acetate, manufactured by DIC Graphics Corporation) | 122 parts by mass |

Example 2

A pressure-sensitive or bonding adhesive sheet of Example 2 was obtained in the same manner as in Example 1, except that, in the composition A for pressure-sensitive or bonding adhesive layer formation in Example 1, the acrylic resin was changed to other acrylic resin (methyl methacrylate-butyl acrylate-methyl methacrylate triblock copolymer, Tg: −42° C., manufactured by Arkema Inc., tradename: M22).

Example 3

A pressure-sensitive or bonding adhesive sheet of Example 3 was obtained in the same manner as in Example 1, except that, in composition A for pressure-sensitive or bonding adhesive layer formation in Example 1, the acrylic resin was changed to other acrylic resin (ethyl acrylate-butyl acrylate-acrylonitrile copolymer, Tg:12° C., manufactured by Nagase ChemteX Corporation, tradename: SG-P3).

Examples 4 to 9

Pressure-sensitive or bonding adhesive sheets of Examples 4 to 9 were obtained in the same manner as in Example 1, except that, in composition A for pressure-sensitive or bonding adhesive layer in Example 1, the mixing amounts of the acrylic resin, the liquid epoxy resin, and the solid epoxy resin were changed as specified in Table 1.

Example 10

A pressure-sensitive or bonding adhesive sheet of Example 10 was obtained in the same manner as in Example 1, except that the thickness of the pressure-sensitive or bonding adhesive layer 2 was changed to 300 μm.

Comparative Example 1

A pressure-sensitive or bonding adhesive sheet of Comparative Example 1 was obtained in the same manner as in Example 1, except that, Example 1, the acrylic resin was changed to other acrylic resin (ethyl acrylate-methyl methacrylate copolymer, Tg: 18° C., manufactured by Negami Chemical Industrial Co., Ltd., tradename: W-197C).

Comparative Example 2

A pressure-sensitive or bonding adhesive sheet of Comparative Example 2 was obtained in the same manner as in Example 1, except that, in Example 1, the acrylic resin was changed to other acrylic resin (polymethyl methacrylate, Tg:105° C., manufactured by Toeikasei Co, Ltd., tradename: LC #6500).

Comparative Example 3 to 7

Pressure-sensitive or bonding adhesive sheets of Comparative Examples 3 to 7 were obtained in the same manner as in Example 1, except that, in Example 1, the mixing amounts of the acrylic resin, the liquid epoxy resin, and the solid epoxy resin were changed as specified in Table 1.

Example 11

A pressure-sensitive or bonding adhesive sheet of Example 11 was obtained in the same manner as in Example 1, except that, in Example 1, composition B for pressure-sensitive or bonding adhesive layer formation was used instead of composition A for pressure-sensitive or bonding adhesive layer formation. Composition B for pressure-sensitive or bonding adhesive layer formation was prepared by mixing the liquid epoxy resin, the solid epoxy resin, the acrylic resin, and the diluting solvent together, stirring the mixture with a disper at a rotation speed of 1200 rpm for 30 min for dissolution, then further adding a mercapto group-containing curing agent and photobase generator A, stirring the mixture with a disper at a rotation speed of 1200 rpm for 30 min for dissolution, and defoaming the solution.

(Composition B for Pressure-Sensitive or Bonding Adhesive Layer Formation)

| | |
|---|---|
| Acrylic resin (modified methyl methacrylate-butyl acrylate-methyl methacrylate triblock copolymer with hydroxyl group introduced thereinto, Tg: −42° C., manufactured by Arkema Inc., tradename: M22N) | 30 parts by mass |
| Liquid epoxy resin (bisphenol A epoxy resin, epoxy equivalent: 190 g/eq., manufactured by Mitsubishi Chemical Corporation, tradename: jER828) | 80 parts by mass |
| Solid epoxy resin (bisphenol A epoxy resin, epoxy equivalent: 480 g/eq., manufactured by Mitsubishi Chemical Corporation, tradename: jER1001) | 120 parts by mass |
| PEMP as curing agent having mercapto group (pentaerythritol tetrakis-3-mercaptopropionate, Viscosity: 400-550 mPa · s/25° C., Mercaptan equivalent: 125-137 g/eq, Mitsubishi Chemical Corporation, tradename: QX40) | 90 parts by mass |
| Photobase generator A (see a synthesis method that will be described later) | 10 parts by mass |
| Diluting solvent (ethyl acetate, manufactured by DIC Graphics Corporation) | 122 parts by mass |

(Synthesis of Photobase Generator A)

Methanol (15 mL) was placed in a 100-mL flask, and 2.00 g of potassium carbonate was added thereto. Subsequently, 10 mL of methanol was placed in a 50-mL flask. Ethoxycarbonylmethyl(triphenyl)phosphonium bromide (manufactured by Tokyo Chemical Industry Co., Ltd.) (2.67 g (6.2 mmol)) and 1.7 g (6.2 mmol) of 2-hydroxy-4-(5-ethylhexyloxy)-5-ethylbenzaldehyde were added to and dissolved in the mixture. The thoroughly stirred methanol solution of potassium carbonate was then slowly added dropwise to the solution, the mixture was stirred for 3 hr, and the completion of the reaction was confirmed by TLC. Subsequently, potassium carbonate was removed by filtration, followed by concentration under the reduced pressure. After the concentration, 50 mL of a 1 N aqueous sodium hydroxide solution was added, and the mixture was stirred for one hr. After the completion of the reaction, triphenyiphosphine oxide was removed by filtration, concentrated hydrochloric acid was added dropwise thereto, and the reaction solution was acidified. The precipitates were collected by filtration and were washed with a small amount of chloroform to give 1.7 g of 2-hydroxy-4-(5-ethylhexyloxy)-5-ethylcinnamic acid. Subsequently, 1.0 g (3.19 mmol) of 2-hydroxy-4-(5-ethylhexyloxy)-5-ethylcinnamic acid was dissolved under a nitrogen atmosphere in 10 mL of dehydrated tetrahydrofuran in a 100-mL three-necked flask. 1-Ethyl-3-(3-dimethylaminopropyl)carbodiimide hydrochloride (manufactured by Tokyo Chemical Industry Co., Ltd.) (0.73 g (3.83 mmol, 1.2 eq) was added to the solution under an ice bath, and 30 min after the addition, 129 mg (1.52 mmol, 0.95 eq) of piperidine (manufactured by Tokyo Chemical Industry Co., Ltd.) was added as an amine thereto, followed by stirring overnight. After the completion of the reaction, the reaction solution was concentrated, and the concentrate was dissolved in water. The solution was extracted with chloroform. The extract was washed with an aqueous hydrogen carbonate solution, 1 N hydrochloric acid, and saturated brine, was dried over sodium sulfate, and was then concentrated to give 1.0 g of photobase generator A represented by formula (I);

[Chemical formula 2]

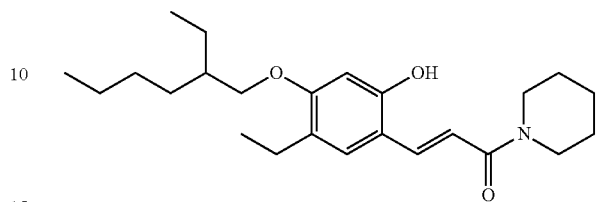

(I)

Example 12

A pressure-sensitive or bonding adhesive sheet of Example 12 was obtained in the same manner as in Example 11, except that, in composition B for pressure-sensitive or bonding adhesive layer formation of Example 11, 10 parts by mass of the following photobase generator B was used instead of photobase generator A.

(Synthesis of Photobase Generator B)

Photobase generator B (0.8 g) of formula (II) was obtained by the same method as described in the synthesis of photobase generator A, except that 1.5 g (6.2 mmol) of 2-hydroxy-5-(5-ethylhexyloxy)benzaldehyde was added instead of 2-hydroxy-4-(5-ethylhexyloxy)-5-ethylbenzaldehyde as photobase generator A.

[Chemical formula 3]

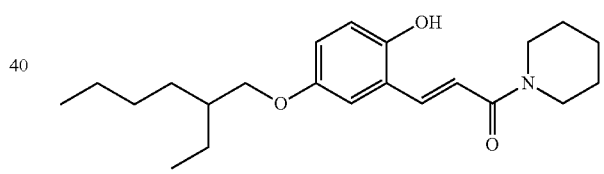

(II)

Example 13

A pressure-sensitive or bonding adhesive sheet was obtained in the same manner as in Example 1, except that the thickness of the pressure-sensitive or bonding adhesive layer 2 was changed to 200 μm. One separation film (SP-PET-01) in two separation films provided on the pressure-sensitive or bonding adhesive layer 2 in the pressure-sensitive or bonding adhesive sheet was separated. An aramid fiber (mass per unit area: 90 g/m², thickness: about 0.024 mm, manufactured by Fibex Co., Ltd., tradename: AKM-5/5) was laminated as a reinforcing sheet while heating the exposed pressure-sensitive or bonding adhesive layer 2 to 60° C.

Subsequently, another pressure-sensitive or bonding adhesive sheet was laminated onto the laminated aramid fiber. This pressure-sensitive or bonding adhesive sheet is also a pressure-sensitive or bonding adhesive sheet obtained in the same manner as in Example 1. Also in the pressure-sensitive or bonding adhesive sheet, as described above, one separation film (SP-PET-01) in the two separation films was separated, and the exposed pressure-sensitive or bonding adhesive layer 2 was laminated onto the araimid fiber while heating the pressure-sensitive or bonding adhesive layer 2 to 60° C. Thus, a pressure-sensitive or bonding adhesive sheet 10E (see FIG. 3(A)) having two pressure-sensitive or bonding adhesive layers was obtained. As described in the column of [Pressure-sensitive or bonding adhesive sheet], the pressure-sensitive or bonding adhesive layer provided on the repairing or reinforcing sheet (aramid fiber) in the pressure-sensitive or bonding adhesive layers in the pressure-sensitive or bonding adhesive sheet having two pressure-sensitive or bonding adhesive layers as shown in FIGS. 3 (A), (B), and (C) is also called a "pressure-sensitive or bonding adhesive layer 2'." The pressure-sensitive or bonding adhesive sheet 10E thus obtained has a construction of separation film (SP-PET-03)/pressure-sensitive or bonding adhesive layer 2/aramid fiber/pressure-sensitive or bonding adhesive layer 2'/separation film (SP-PET-03) provided in that order.

Examples 14 and 15

Pressure-sensitive or bonding adhesive sheets of Examples 14 and 15 were obtained in the same manner as in Example 13, except that, in Example 13, the mixing amounts of the acrylic resin, the liquid epoxy resin, and the solid epoxy resin in composition A for pressure-sensitive or bonding adhesive layer 2 formation and pressure-sensitive or bonding adhesive layer 2' formation were changed as specified in Table 2.

Example 16

A pressure-sensitive or bonding adhesive sheet of Example 16 was obtained in the same manner as in Example 13, except that, in Example 13, an aramid fiber (mass per unit area: 180 g/m$^2$, thickness: about 0.048 mm, manufactured by Fibex Co., Ltd., tradename: AKM-10/10) was used instead of the aramid fiber (mass per unit area: 90 g/m$^2$, thickness: about 0.024 mm, manufactured by Fibex Co., Ltd., tradename: AKM-5/5).

Comparative Examples 8 and 9

Pressure-sensitive or bonding adhesive sheets of Comparative Examples 8 and 9 were obtained in the same manner as in Example 13, except that, in Example 13, the mixing amounts of the acrylic resin, the liquid epoxy resin, and the solid epoxy resin in composition A for pressure-sensitive or bonding adhesive layer formation used in the formation of the pressure-sensitive or bonding adhesive layer 2 and the pressure-sensitive or binding adhesive layer 2' were changed as specified in Table 2.

Example 17

A pressure-sensitive or bonding adhesive sheet of Example 17 was obtained in the same manner as in Example 13, except that, in Example 13, composition B for pressure-sensitive or bonding adhesive layer formation of Example 11 was used instead of composition A for pressure-sensitive or bonding adhesive layer formation.

Example 18

A pressure-sensitive or bonding adhesive sheet of Example 18 was obtained in the same manner as in Example 13, except that, in Example 13, composition B for pressure-sensitive or bonding adhesive layer formation of Example 11 was used instead of composition A for pressure-sensitive or bonding adhesive layer formation and, further, an aramid fiber (mass per unit area: 180 g/m$^2$, thickness: about 0.048 mm, manufactured by Fibex Co., Ltd., tradename: AKM-10/10) was used instead of the aramid fiber (mass per unit area: 90 g/m$^2$, thickness: about 0.024 mm, manufactured by Fibex Co., Ltd., tradename: AKM-5/5).

EVALUATION AND RESULTS

Compositions of the pressure-sensitive or bonding adhesive layers 2 constituting the pressure-sensitive or bonding adhesive sheets 10 of Examples 1 to 12 and Comparative Examples 1 to 7 that are pressure-sensitive or bonding adhesive sheets having one pressure-sensitive or bonding adhesive layer as shown in FIG. 1 or 2 are shown in Table 1. Compositions of the pressure-sensitive or bonding adhesive layer 2 and the pressure-sensitive or bonding adhesive layer 2' constituting the pressure-sensitive or bonding adhesive sheets 10 of Examples 13 to 18 and Comparative Examples 8 and 9 that are pressure-sensitive or bonding adhesive sheets having two pressure-sensitive or bonding adhesive layers as shown in FIG. 3 are shown in Table 2. For example, in Example 1, the content of the acrylic resin was determined by [30 parts by mass/(30 parts by mass+80 parts by mass+120 parts by mass)×100]=13.0% by mass. For example, in Example 1, the content of the liquid epoxy resin was determined by [80 parts by mass/(80 parts by mass+120 parts by mass)×100]=40.0% by mass, and, for Example 1, the content of the solid epoxy resin was determined by [120 parts by mass/(80 parts by mass+120 parts by mass)×100]=60.0% by mass.

TABLE 1

| | Pressure-sensitive adhesive layer | | | | | | | |
|---|---|---|---|---|---|---|---|---|
| | | | Acrylic resin | | Liquid epoxy resin | | Solid epoxy resin | |
| | Type (tradename) | Tg (° C.) | Mixing amount (parts) | Content (mass %) | Mixing amount (parts) | Content (mass %) | Mixing amount (parts) | Content (mass %) |
| Example 1 | M22N | −42 | 30 | 13.0 | 80 | 40.0 | 120 | 60.0 |
| Example 2 | M22 | −42 | 30 | 13.0 | 80 | 40.0 | 120 | 60.0 |
| Example 3 | SG-P3 | 12 | 30 | 13.0 | 80 | 40.0 | 120 | 60.0 |
| Example 4 | M22N | −42 | 100 | 33.3 | 50 | 25.0 | 150 | 75.0 |
| Example 5 | M22N | −42 | 100 | 33.3 | 150 | 75.0 | 50 | 25.0 |
| Example 6 | M22N | −42 | 100 | 33.3 | 80 | 40.0 | 120 | 60.0 |
| Example 7 | M22N | −42 | 10 | 4.76 | 80 | 40.0 | 120 | 60.0 |
| Example 8 | M22N | −42 | 50 | 20.0 | 80 | 40.0 | 120 | 60.0 |
| Example 9 | M22N | −42 | 200 | 50.0 | 80 | 40.0 | 120 | 60.0 |

TABLE 1-continued

| | Pressure-sensitive adhesive layer | | | | | | | |
|---|---|---|---|---|---|---|---|---|
| | Acrylic resin | | | | Liquid epoxy resin | | Solid epoxy resin | |
| | Type (tradename) | Tg (° C.) | Mixing amount (parts) | Content (mass %) | Mixing amount (parts) | Content (mass %) | Mixing amount (parts) | Content (mass %) |
| Example 10 | M22N | −42 | 30 | 13.0 | 80 | 40.0 | 120 | 60.0 |
| Comparative Example 1 | W-197C | 18 | 30 | 13.0 | 80 | 40.0 | 120 | 60.0 |
| Comparative Example 2 | LC#6500 | 105 | 30 | 13.0 | 80 | 40.0 | 120 | 60.0 |
| Comparative Example 3 | M22N | −42 | 100 | 100 | 0 | 0 | 0 | 0 |
| Comparative Example 4 | — | — | 0 | 0 | 200 | 100 | 0 | 0 |
| Comparative Example 5 | — | — | 0 | 0 | 0 | 0 | 200 | 100 |
| Comparative Example 6 | M22N | −42 | 100 | 33.3 | 200 | 100 | 0 | 0 |
| Comparative Example 7 | M22N | −42 | 100 | 33.3 | 0 | 0 | 200 | 100 |
| Example 11 | M22N | −42 | 30 | 13.0 | 80 | 40.0 | 120 | 60.0 |
| Example 12 | M22N | −42 | 30 | 13.0 | 80 | 40.0 | 120 | 60.0 |

*) Parts are by mass.

TABLE 2

| | | Pressure-sensitive adhesive layer | | | | | | | |
|---|---|---|---|---|---|---|---|---|---|
| | | Acrylic resin | | | | Liquid epoxy resin | | Solid epoxy resin | |
| | | Type (trade-name) | Tg (° C.) | Mixing amount (parts) | Content (mass %) | Mixing amount (parts) | Content (mass %) | Mixing amount (parts) | Content (mass %) |
| Example 13 | Pressure-sensitive adhesive layer 2 | M22N | −42 | 30 | 13 | 80 | 40 | 120 | 60 |
| | Pressure-sensitive adhesive layer 2' | M22N | −42 | 30 | 13 | 80 | 40 | 120 | 60 |
| Example 14 | Pressure-sensitive adhesive layer 2 | M22N | −42 | 30 | 13 | 80 | 40 | 120 | 60 |
| | Pressure-sensitive adhesive layer 2' | SG-P3 | 12 | 30 | 13 | 80 | 40 | 120 | 60 |
| Example 15 | Pressure-sensitive adhesive layer 2 | SG-P3 | 12 | 30 | 13 | 80 | 40 | 120 | 60 |
| | Pressure-sensitive adhesive layer 2' | SG-P3 | 12 | 30 | 13 | 80 | 40 | 120 | 60 |
| Example 16 | Pressure-sensitive adhesive layer 2 | M22N | −42 | 30 | 13 | 80 | 40 | 120 | 60 |
| | Pressure-sensitive adhesive layer 2' | M22N | −42 | 30 | 13 | 80 | 40 | 120 | 60 |
| Comparative Example 8 | Pressure-sensitive adhesive layer 2 | W-197C | 18 | 30 | 13 | 80 | 40 | 120 | 60 |
| | Pressure-sensitive adhesive layer 2' | W-197C | 18 | 30 | 13 | 80 | 40 | 120 | 60 |

TABLE 2-continued

| | | Pressure-sensitive adhesive layer | | | | | | | |
|---|---|---|---|---|---|---|---|---|---|
| | | Acrylic resin | | | | Liquid epoxy resin | | Solid epoxy resin | |
| | | Type (trade-name) | Tg (° C.) | Mixing amount (parts) | Content (mass %) | Mixing amount (parts) | Content (mass %) | Mixing amount (parts) | Content (mass %) |
| Comparative Example 9 | Pressure-sensitive adhesive layer 2 | — | — | 0 | 0 | 200 | 100 | 0 | 0 |
| | Pressure-sensitive adhesive layer 2' | — | — | 0 | 0 | 0 | 0 | 200 | 100 |
| Example 17 | Pressure-sensitive adhesive layer 2 | M22N | −42 | 30 | 13 | 80 | 40 | 120 | 60 |
| | Pressure-sensitive adhesive layer 2' | M22N | −42 | 30 | 13 | 80 | 40 | 120 | 60 |
| Example 18 | Pressure-sensitive adhesive layer 2 | M22N | −42 | 30 | 13 | 80 | 40 | 120 | 60 |
| | Pressure-sensitive adhesive layer 2' | M22N | −42 | 30 | 13 | 80 | 40 | 120 | 60 |

*) Parts are by mass.

The adhesive strength was measured for the pressure-sensitive or bonding adhesive sheets 10 of Examples 1 to 18 and Comparative Example 6. The pressure-sensitive or bonding adhesive sheets of Examples 1 to 18 and Comparative Examples 1 to 9 were subjected to the measurement of shearing strength, a punching test, and the measurement of bond strength.

(Measurement of Adhesive Strength)

In the measurement of the adhesive strength of the pressure-sensitive or bonding adhesive sheets obtained in Examples 1 to 12 and Comparative Example 6, at the outset, the separation film (SP-PET-01) in the pressure-sensitive or bonding adhesive sheets was separated, and the exposed pressure-sensitive or bonding adhesive layer 2 was applied onto a corona-treated surface of a base (a PET film having one surface subjected to corona treatment, thickness: 38 μm, manufactured by Toyobo Co., Ltd., tradename: E5100). Thereafter, the assembly was cut into a size of 25 mm×150 mm to prepare specimens for adhesive strength measurement. Subsequently, the separation film (SP-PET-03) in the specimen was separated, and the exposed pressure-sensitive or bonding adhesive layer 2 was laminated onto a stainless steel plate (SUS304) by a roller. Thereafter, the adhesive strength (N/25 mm) to the stainless steel plate surface was measured with a tensile tester (manufactured by A & D Co., LTD., model: RTF-1150H) under conditions according to JIS Z 0237 (tensile speed: 300 mm/min, separating distance: 150 mm, separating angle: 180°). The results are shown in Table 3. For the pressure-sensitive or bonding adhesive sheets of Comparative Examples 1 to 5 and 7, the measurement could not be carried out, because the pressure-sensitive or bonding adhesive layer 2 could not be applied to the stainless steel plate surface.

In the measurement of the adhesive strength of the pressure-sensitive or bonding adhesive sheets obtained in Examples 13 to 18, at the outset, the separation film (SP-PET-03) provided on one pressure-sensitive or bonding adhesive layer 2 in two pressure-sensitive or bonding adhesive layers provided in the pressure-sensitive or bonding adhesive sheets was separated, and the exposed pressure-sensitive or bonding adhesive layer 2 was applied to a corona-treated surface of a base in the same manner as described above. Thereafter, the assembly was cut into a size of 25 mm×150 mm to prepare specimens for adhesive strength measurement. Subsequently, the other separation film (SP-PET-03) was separated from the specimens, and the exposed pressure-sensitive or bonding adhesive layer 2' was laminated onto a stainless steel plate (SUS304) by a roller. Thereafter, the adhesive strength (N/25 mm) to the stainless steel plate surface was measured using the same tensile tester and measurement conditions as used above. The results are shown in Table 4. For the pressure-sensitive or bonding adhesive sheets of Comparative Examples 8 and 9, the measurement could not be carried out, because the pressure-sensitive or bonding adhesive layer 2' could not be applied to the stainless steel plate surface.

(Measurement of Shearing Strength)

In the measurement of the shearing strength of the pressure-sensitive or bonding adhesive sheets obtained in Examples 1 to 12 and Comparative Example 1 to 7, at the outset, the pressure-sensitive or bonding adhesive sheets were cut into a size of 25 mm×12.5 mm, and one separation film (SP-PET-01) in two separation films provided on the pressure-sensitive or bonding adhesive layer in the pressure-sensitive or bonding adhesive sheets was separated. The exposed pressure-sensitive or bonding adhesive layer 2 was pressure-bonded to a hot-dip galvanized steel plate that had been washed with alcohol. Subsequently, the other separation film (SP-PET-03) was separated, and the exposed pressure-sensitive or bonding adhesive layer was pressure-bonded to a hot-dip galvanized steel plate as another specimen.

When the pressure-sensitive or bonding adhesive sheets of Examples 1 to 10 and Comparative Examples 1 to 7 were used, samples for shearing strength measurement were prepared by holding the sheets at 120° C. for 2 hr in a fan oven while applying a load of 1 kg for heat curing, allowing the sheets to cool at room temperature (about 23° C.). On the other hand, when the pressure-sensitive or bonding adhesive sheets of Examples 11 and 12 were used, an ultraviolet light was applied with an ultraviolet irradiation apparatus (H bulb, manufactured by Fusion UV Systems Japan, tradename: DRE-10/12QN) so that the integrated quantity of light in a wavelength range of 300 to 370 nm was 1000 mJ/cm$^2$. Thus, the sheets were cured by ultraviolet irradiation to prepare samples for shearing strength measurement. Subsequently, for these samples for measurement, the shearing strength (N/mm$^2$) stress at room temperature was measured with a tensile tester (manufactured by A & D Co., LTD., model: RTA-1T) under conditions according to JIS K 6850 (tensile speed: 0.5 mm/min). The results on the pressure-sensitive or bonding adhesive sheets of Examples 1 to 12 and Comparative Examples 1 to 7 are shown in Table 3.

In the measurement of the shearing strength of the pressure-sensitive or bonding adhesive sheets obtained in Examples 13 to 18 and Comparative Example 8 and 9, at the outset, the pressure-sensitive or bonding adhesive sheets were cut into a size of 25 mm×12.5 mm, and one separation film (SP-PET-03) in two separation films provided on the pressure-sensitive or bonding adhesive layer 2 was separated. The exposed pressure-sensitive or bonding adhesive layer 2 was pressure-bonded to a hot-dip galvanized steel plate that had been washed with alcohol. Subsequently, the other separation film (SP-PET-03) provided on the pressure-sensitive or bonding adhesive layer 2' was separated, and the exposed pressure-sensitive or bonding adhesive layer 2' was pressure-bonded to a hot-dip galvanized steel plate as another specimen.

When the pressure-sensitive or bonding adhesive sheets of Examples 13 to 16 and Comparative Examples 8 and 9 were used, samples for shearing strength measurement were prepared in the same manner as described above in connection with the use of the pressure-sensitive or bonding adhesive sheets of Examples 1 to 10 and Comparative Examples 1 to 7. On the other hand, when the pressure-sensitive or bonding adhesive sheets of Examples 17 and 18 were used, they were cured using the same ultraviolet irradiation apparatus and curing conditions as described above in connection with the use of the pressure-sensitive or bonding adhesive sheets of Examples 11 and 12 to prepare samples for shearing strength measurement. Subsequently, for these samples for measurement, the shearing strength (N/mm$^2$) stress was measured using the same tensile tester and measuring conditions. The results on the pressure-sensitive or bonding adhesive sheets obtained in Examples 13 to 18 and Comparative Examples 8 and 9 are shown in Table 4. For the pressure-sensitive or bonding adhesive sheets of Comparative Examples 8 and 9, during the measurement of the shearing strength, separation occurred at the interface of the pressure-sensitive or bonding adhesive layer 2 and the aramid fiber or at the interface of the pressure-sensitive or bonding adhesive layer 2' and the aramid fiber, and, thus, the value at the separation occurred was regarded as a measured value of the shearing strength, (Punching Test and Observation of Separation)

In a punching test, at the outset, a pressure-sensitive or bonding adhesive sheet including a repairing or reinforcing sheet was prepared. In the preparation of the pressure-sensitive or bonding adhesive sheet, at the outset, a urethane-based two-component curable adhesive (manufactured by Mitsui Chemicals Inc., tradename of main agent: Takelac A-310, tradename of curing agent: Takenate A-3) was coated on one surface of a resin film (thickness: 15 μm, manufactured by Mitsubishi Plastics, Inc., tradename: Supernyl E15) at a coverage of 5 g/m$^2$ on a solid basis, and a thermal bond non-woven fabric (basis weight: 23 g/m$^2$, manufactured by Daio Paper Corporation, tradename: polyester paper) prepared by a wet process was stacked by dry lamination. Subsequently, a urethane-based two-component curable adhesive (manufactured by Mitsui Chemicals Inc., tradename of main agent: Takelac A-310, tradename of curing agent:Takenate A-3) was coated on the other surface of the resin film at a coverage of 12 g/m$^2$ on a solid basis, and a polyethylene terephthalate cloth (plain weave, fineness: 250 d, applied number of weaving yarns: 43 yarns×43 yarns/inch, basis weight: 105 g/m$^2$) was stacked by dry lamination. Thus, a repairing or reinforcing sheet was produced.

One separation film (SP-PET-01) in two separation films provided on the pressure-sensitive or bonding adhesive layer 2 in the pressure-sensitive or bonding adhesive sheets obtained in Examples 1 to 12 and Comparative Examples 1 to 7 was separated, and the exposed pressure-sensitive or bonding adhesive layer 2 was laminated on a polyethylene terephthalate cloth side of the repairing or reinforcing sheet while heating to 60° C. to prepare a pressure-sensitive or bonding adhesive sheet including the repairing or reinforcing sheet. Likewise, the separation film (SP-PET-03) provided on the pressure-sensitive or bonding adhesive layer 2' provided on the aramid fiber in the two pressure-sensitive or bonding adhesive layers provided in the pressure-sensitive or bonding adhesive sheets obtained in Examples 13 to 18 and Comparative Examples 8 and 9 was separated. The exposed pressure-sensitive or bonding adhesive layer 2' was laminated on a polyethylene terephthalate cloth side of the repairing or reinforcing sheet under the same conditions as described just above to prepare a pressure-sensitive or bonding adhesive sheet including the repairing or reinforcing sheet.

A product obtained by forming a through-hole at a center of a U-shaped lid of normal designation "type 1 300" (400 mm×600 mm×60 mm) specified in JIS A5372 (precast reinforced concrete product) appendix 5 with a cylindrical core cutter (diameter 100 mm) for concrete was used as an adherend.

When the pressure-sensitive or bonding adhesive sheets of Examples 1 to 10 and Comparative Examples 1 to 7 were used, the other separation film (SP-PET-03) in the pressure-sensitive or bonding adhesive sheets including the repairing or reinforcing sheet was separated. The exposed pressure-sensitive or bonding adhesive layer 2 was applied in a range of 400 mm×600 mm in a U-shaped lid in an adherend while heating to 120° C. by a hand roller. Thereafter, the assembly was allowed to stand at room temperature for 4 days. Likewise, when the pressure-sensitive or bonding adhesive sheets of Examples 13 to 16 and Comparative Examples 8 and 9 were used, the separation film (SP-PET-03) provided on the other pressure-sensitive or bonding adhesive layer 2 in the pressure-sensitive or bonding adhesive sheets including the repairing or reinforcing sheet was separated. The exposed pressure-sensitive or bonding adhesive layer 2 was applied to the adherend under the same conditions described just above, and the assembly was allowed to stand.

When the pressure-sensitive or bonding adhesive sheets of Examples 11 and 12 were used, the other separation film (SP-PET-03) of the pressure-sensitive or bonding adhesive sheets including the repairing or reinforcing sheet was separated. The exposed pressure-sensitive or bonding adhesive layer 2 was applied in a range of 400 mm×600 mm in a U-shaped lid in an adherend by a hand roller. Thereafter, an ultraviolet light was applied with the ultraviolet irradiation apparatus used in the shearing strength measurement so that the integrated quantity of light in a wavelength range of 300 to 370 nm was 1000 mJ/cm², thereby curing the sheets. Likewise, when the pressure-sensitive or bonding adhesive sheets of Examples 17 and 18 were used, the separation film (SP-PET-03) provided the other pressure-sensitive or bonding adhesive layer 2 in the pressure-sensitive or bonding adhesive sheet including the repairing or reinforcing sheet was separated. The exposed pressure-sensitive or bonding adhesive layer 2 was applied to the adherend under the same conditions as described just above, followed by curing.

A load was applied at a speed of 0.2 mm/min in a standard state (temperature 23° C.±2° C., relative humidity 50%±5%) specified in 4 in JIS K6848-1, and, further, a load was applied at a speed of 1.0 mm/min from a displacement of 2.0 mm to measure a punching maximum load (kN). The results are shown in Table 3 and 4. During the measurement, for each displacement of 2.0 mm, the application of the load was stopped for 2 min, and the separation of the repairing or reinforcing sheet was visually observed.

(Measurement of Bond Strength)

Pressure-sensitive or bonding adhesive sheets including a repairing or reinforcing sheet that are the same as those prepared in the punching test were produced. The separation film (SP-PET-03) provided on the pressure-sensitive or bonding adhesive sheets was separated, and the exposed pressure-sensitive or bonding adhesive layer was cured by applying an ultraviolet light from the pressure-sensitive or bonding adhesive sheet side with the ultraviolet irradiation apparatus used in the measurement of the shearing strength so that the integrated quantity of light in a wavelength range of 300 to 370 nm was 1000 mJ/cm². Thereafter, the pressure-sensitive or bonding adhesive layer side of the sheets was applied to a 60 mm-thick concrete by a hand roller, and the assembly was allowed to stand at room temperature for 7 days. The samples were cut into a size of 40 mm×40 mm with a core cutter for concrete and were evaluated by an exfoliation preventive property verification test (JHS 424 2004). As a result, all the pressure-sensitive or bonding adhesive sheets of Example 1 to 3 and Example 11 to 18 had a bond strength of not less than 1.5 N/mm² and a punching strength of not less than 1800 N that each are on a level that does not pose a practical issue. A failure in the measurement of the bond strength in the exfoliation preventive property verification test occurred in the repairing or reinforcing sheet per se or by an aggregation failure of the pressure-sensitive or bonding adhesive sheet.

In the exfoliation preventive property verification test (JHS 424 2004), at the outset, both surfaces of the sample were held between two steel attachments (40 mm×40 mm) through an adhesive, and the attachment was bonded and fixed to both surfaces of the sample. The adhesive spread out from the periphery of the sample was wiped off, and the assembly as such was allowed to stand at room temperature for 24 hr. Thereafter, the steel attachment was mounted on a tensile tester, and a tensile test was carried out, and a load-displacement curve from the start of the test to the failure was recorded. The maximum load was determined from the load-displacement curve, and the bond strength was calculated by the following equation: S (bond strength: N/mm²)=P (maximum load: N)/sample area (area: mm²).

(Results)

The results are shown in Tables 3 and 4. "*" in Tables 3 and 4 indicates that the measurement could not be made because the pressure-sensitive or bonding adhesive layer could not be applied to the surface of the stainless steel plate. "Note" in Table 4 indicates that, since separation occurred at the interface of the pressure-sensitive or bonding adhesive layer 2 and the aramid fiber or at the interface of the pressure-sensitive or bonding adhesive layer 2' and the aramid fiber during the measurement of the shearing strength, the shearing strength when the separation occurred was regarded as the shearing strength of the pressure-sensitive or bonding adhesive sheet.

TABLE 3

| | Pressure-sensitive adhesive force (N/25 mm) | Shearing strength (N/mm²) | Bond strength (N/mm²) | Punching maximum load (N) |
|---|---|---|---|---|
| Example 1 | 0.5 | 30 | 2.01 | 2050 |
| Example 2 | 0.4 | 28 | 2.07 | 2010 |
| Example 3 | 2.1 | 25 | 2.01 | 1980 |
| Example 4 | 0.6 | 26 | — | 1970 |
| Example 5 | 1 | 28 | — | 2060 |
| Example 6 | 0.8 | 25 | — | 2000 |
| Example 7 | 3.2 | 32 | — | 2120 |
| Example 8 | 0.8 | 31 | — | 2100 |
| Example 9 | 0.9 | 18 | — | 1800 |
| Example 10 | 1 | 35 | — | 3540 |
| Comparative Example 1 | * | 5 | — | 800 |
| Comparative Example 2 | * | 10 | — | 850 |
| Comparative Example 3 | * | 2 | — | 700 |
| Comparative Example 4 | * | 11 | — | 1100 |
| Comparative Example 5 | * | 11 | — | 1000 |
| Comparative Example 6 | 0.2 | 13 | — | 1300 |
| Comparative Example 7 | * | 13 | — | 1400 |
| Example 11 | 3.5 | 23 | 2.1 | 2200 |
| Example 12 | 3.2 | 25 | 2.2 | 2150 |

TABLE 4

| | Pressure-sensitive adhesive force (N/25 mm) | Shearing strength (N/mm²) | Bond strength (N/mm²) | Punching maximum load (N) |
|---|---|---|---|---|
| Example 13 | 2.1 | Not less than 50 | 2.3 | 3280 |
| Example 14 | 3.2 | Not less than 50 | 2.21 | 3180 |
| Example 15 | 4.5 | Not less than 50 | 2.11 | 3080 |
| Example 16 | 4.1 | Not less than 50 | 2.21 | 3640 |
| Comparative Example 8 | * | 15[note] | — | 1300 |
| Comparative Example 9 | * | 18[note] | — | 1300 |
| Example 17 | 5.6 | Not less than 50 | 2.05 | 3250 |
| Example 18 | 6.3 | Not less than 50 | 2.11 | 3120 |

From the results of Tables 3 and 4, it was found that the pressure-sensitive or bonding adhesive sheets of Examples 1 to 18 had a pressure-sensitive adhesive strength of not less than 0.3 N/25 mm and a shearing strength of not less than 18 MPa and the pressure-sensitive or bonding adhesive layer had a pressure-sensitive adhesive strength and a high adhesive strength. Further, the pressure-sensitive or bonding adhesive sheets of Examples 1 to 18 had a punching maximum load of not less than 1800 N and could repair and reinforce concrete with a high strength. As a result of observation on the separation of the repairing or reinforcing sheet, it was found that, when the pressure-sensitive or bonding adhesive sheets of Examples 1 to 18 were used, no separation occurred, whereas, when the pressure-sensitive or bonding adhesive sheets of Comparative Examples 1 to 7 were used, separation occurred. For Comparative Examples 8 and 9, the adhesion to the aramid fiber was so poor that the bond strength was not satisfactory.

In Examples 1 to 18, the content of the acrylic resin in the pressure-sensitive or bonding adhesive layer was 4.76% by mass to 50.0% by mass, and it was confirmed that good results could be obtained in this content range. Further, it was confirmed that particularly good results could be obtained in an acrylic resin content range of 4.76% by mass to 33.4% by mass.

For the pressure-sensitive or bonding adhesive sheets of Examples 13 to 18, even immediately after the application of concrete to one pressure-sensitive or bonding adhesive layer 2 in the two pressure-sensitive or bonding adhesive layers in the pressure-sensitive or bonding adhesive sheets of Examples 13 to 18, the surface of the other pressure-sensitive or bonding adhesive layer 2' was hardly influenced by irregularities of the aramid fiber and the concrete and was flat and smooth.

DESCRIPTION OF REFERENCE CHARACTERS 1,1' Separation film
2,2' Pressure-sensitive or bonding adhesive layer
3 Repairing or reinforcing sheet
10,10A to 10G Pressure-sensitive or bonding adhesive sheet
S1,S2,S1',S2' Surface of pressure-sensitive or bonding adhesive layer

The invention claimed is:

1. A repairing or reinforcement method comprising:
applying, to concrete, a pressure-sensitive or bonding adhesive sheet containing a first pressure-sensitive or bonding adhesive layer comprising:
an acrylic resin having a glass transition temperature of 15° C. or below;
a liquid epoxy resin;
a solid epoxy resin; and
a curing agent configured to cure the liquid epoxy resin and the solid epoxy resin, wherein the curing agent includes a combination of (i) a curing catalyst that generates a base by ultraviolet or electron beam irradiation and (ii) either a mercapto group-containing curing agent or a phenolic hydroxyl group-containing curing agent; and
curing the first adhesive layer such that a first surface of the first adhesive layer is bonded to the concrete.

2. The method of claim 1, wherein the first adhesive layer is applied to the concrete by contact bonding.

3. The method of claim 2, wherein the first adhesive layer is cured after the first adhesive layer is applied to the concrete by contact bonding.

4. The method of claim 1, wherein the first adhesive layer is cured by applying heat or by irradiation with ultraviolet light or electron beams.

5. The method of claim 1, wherein the applying and the curing are carried out simultaneously.

6. The method of claim 1, wherein the adhesive sheet further comprises a second pressure-sensitive or bonding adhesive layer, and a repairing or reinforcing sheet that is disposed between the first and second adhesive layers.

7. The method of claim 6, wherein the repairing or reinforcing sheet includes a fiber material.

8. The method of claim 6, wherein the adhesive sheet further comprises a first separation film provided on an outer surface of the second adhesive layer.

9. The method of claim 8, further comprising:
separating the first separation film from the outer surface of the second adhesive layer to expose the outer surface of the second adhesive layer; and
applying an adherend onto the exposed outer surface of the second adhesive layer.

10. The method of claim 8, wherein:
the adhesive sheet further comprises a second separation film provided on the first surface of the first adhesive layer, and
the method further comprises separating the second separation film from the first surface of the first adhesive layer before applying the adhesive sheet to the concrete.

11. The method of claim 8, further comprising:
applying an adherend onto an outer surface of the first adhesive layer.

12. The method of claim 1, wherein the curing agent is a latent curing agent.

13. The method of claim 1, wherein the content of the acrylic resin in the first adhesive layer is greater than or equal to 4% by mass and less than or equal to 50% by mass based on the total amount of the acrylic resin, the liquid epoxy resin, and the solid epoxy resin.

14. The method of claim 1, wherein the content of the liquid epoxy resin in the first adhesive layer is greater than or equal to 20% by mass and less than or equal to 80% by mass based on the total amount of the liquid epoxy resin and the solid epoxy resin.

15. The method of claim 1, wherein the acrylic resin includes block copolymers of methacrylate-acrylate-methacrylate.

16. The method of claim 15, wherein the block copolymers of methacrylate-acrylate-methacrylate have a mass average molecular weight in the range of 400,000 to 1,200,000.

17. The method of claim 1, wherein the acrylic resin has a mass average molecular weight in the range of 150,000 to 1,500,000.

18. The method of claim 1, wherein the liquid epoxy resin has a mass average molecular weight in the range of 300 to 2,000 and an epoxy equivalent of 100 to 800.

19. The method of claim 1, wherein the solid epoxy resin has a mass average molecular weight in the range of 300 to 5,000 and an epoxy equivalent of 100 to 2,200.

20. The method of claim 1, wherein the first pressure-sensitive or bonding adhesive layer has a thickness greater than or equal to 150 μm and less than or equal to 500 μm.

21. The method of claim 1, wherein the mercapto group-containing curing agent is present.

* * * * *